(12) United States Patent
Wei et al.

(10) Patent No.: US 8,570,009 B2
(45) Date of Patent: Oct. 29, 2013

(54) POWER SUPPLY WITH A MAGNETICALLY UNCOUPLED PHASE AND AN ODD NUMBER OF MAGNETICALLY COUPLED PHASES, AND CONTROL FOR A POWER SUPPLY WITH MAGNETICALLY COUPLED AND MAGNETICALLY UNCOUPLED PHASES

(75) Inventors: Jia Wei, Cary, NC (US); Michael Jason Houston, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 739 days.

(21) Appl. No.: 12/136,014

(22) Filed: Jun. 9, 2008

(65) Prior Publication Data

US 2008/0303495 A1 Dec. 11, 2008

Related U.S. Application Data

(60) Provisional application No. 60/933,949, filed on Jun. 8, 2007.

(51) Int. Cl.
*G05F 1/618* (2006.01)
*G05F 1/59* (2006.01)

(52) U.S. Cl.
USPC .......................................... 323/272; 323/284

(58) Field of Classification Search
USPC ......... 323/225, 237, 244, 271, 272, 284, 320, 323/350
See application file for complete search history.

(56) References Cited

U.S. PATENT DOCUMENTS

| | | | |
|---|---|---|---|
| 4,000,509 A | 12/1976 | Jarvela | |
| 4,088,942 A | 5/1978 | Miko | |
| 4,631,471 A | 12/1986 | Fouad et al. | |
| 4,710,798 A | 12/1987 | Marcantonio | |
| 5,204,809 A | 4/1993 | Andresen | |
| 5,414,401 A | 5/1995 | Roshen et al. | |
| 5,631,822 A | 5/1997 | Sliberkleit et al. | |
| 5,764,500 A | 6/1998 | Matos | |

(Continued)

FOREIGN PATENT DOCUMENTS

| | | |
|---|---|---|
| JP | 5602375 | 6/1981 |
| WO | 2006/026674 | 3/2006 |

OTHER PUBLICATIONS

Czogalla (2003) "Automotive Application of Multi-Phase Coupled-Inductor DC-DC Converter" IAS Conference, Oct. 12-16, 3:1524-1529.

(Continued)

*Primary Examiner* — Gary L Laxton
(74) *Attorney, Agent, or Firm* — Paul A. Bernkopf; Graybeal Jackson LLP; Bryan A. Santarelli

(57) ABSTRACT

An embodiment of a power supply includes an input node that receives an input voltage, an output node on which a regulated output voltage is provided, an odd number of magnetically coupled phase paths each coupled between the input and output nodes, and a first magnetically uncoupled phase path coupled between the input and output nodes. Such a power supply can improve its efficiency by activating different combinations of the coupled and uncoupled phase paths depending on the load conditions. For example, the power supply may activate only an uncoupled phase path during light-load conditions, may activate only coupled phase paths during moderate-load conditions, and may activate both coupled and uncoupled phase paths during heavy-load conditions and during a step-up load transient.

32 Claims, 9 Drawing Sheets

(56) References Cited

U.S. PATENT DOCUMENTS

| | | | |
|---|---|---|---|
| 5,790,005 A | | 8/1998 | Santi et al. |
| 5,889,373 A | | 3/1999 | Fisher et al. |
| 5,929,692 A | * | 7/1999 | Carsten .................. 327/531 |
| 5,982,160 A | | 11/1999 | Walters et al. |
| 6,018,468 A | | 1/2000 | Archer et al. |
| 6,144,194 A | * | 11/2000 | Varga ..................... 323/285 |
| 6,239,510 B1 | * | 5/2001 | Azimi et al. .............. 307/38 |
| 6,271,650 B1 | * | 8/2001 | Massie et al. ............ 323/272 |
| 6,272,023 B1 | | 8/2001 | Wittenbreder |
| 6,278,263 B1 | | 8/2001 | Walters et al. |
| 6,362,986 B1 | | 3/2002 | Schultz et al. |
| 6,417,753 B1 | | 7/2002 | Wolf et al. |
| 6,549,436 B1 | | 4/2003 | Sun |
| 6,686,727 B2 | | 2/2004 | Ledenev et al. |
| 6,696,823 B2 | | 2/2004 | Ledenev et al. |
| 6,765,468 B2 | | 7/2004 | Chen et al. |
| 6,822,875 B2 | | 11/2004 | Chan et al. |
| 6,873,237 B2 | | 3/2005 | Chandrasekaran et al. |
| 6,885,274 B2 | | 4/2005 | Hsu et al. |
| 6,980,077 B1 | | 12/2005 | Chandrasekaran et al. |
| 6,995,548 B2 | | 2/2006 | Walters et al. |
| 7,002,325 B2 | | 2/2006 | Harris et al. |
| 7,005,835 B2 | | 2/2006 | Brooks et al. |
| 7,026,798 B2 | | 4/2006 | Cheung et al. |
| 7,046,523 B2 | | 5/2006 | Sun et al. |
| 7,109,691 B2 | | 9/2006 | Brooks et al. |
| 7,136,293 B2 | | 11/2006 | Petkov et al. |
| 7,233,132 B1 | | 6/2007 | Dong et al. |
| 7,242,172 B2 | | 7/2007 | Carlson et al. |
| 7,301,314 B2 | | 11/2007 | Schuellein et al. |
| 7,327,128 B2 | | 2/2008 | Dinh |
| 7,352,269 B2 | | 4/2008 | Li et al. |
| 7,358,710 B2 | | 4/2008 | Luo et al. |
| 7,365,518 B2 | | 4/2008 | Wiseman |
| 7,394,233 B1 | | 7/2008 | Trayling et al. |
| 7,449,867 B2 | | 11/2008 | Wu et al. |
| 7,456,618 B2 | * | 11/2008 | Jain et al. ................ 323/272 |
| 7,468,899 B1 | | 12/2008 | Hopper et al. |
| 7,508,182 B1 | | 3/2009 | Chang |
| 7,514,909 B2 | | 4/2009 | Burstein et al. |
| 7,567,163 B2 | | 7/2009 | Dadafshar et al. |
| 7,782,031 B2 | | 8/2010 | Qiu et al. |
| 7,808,355 B2 | | 10/2010 | Nagano et al. |
| 2003/0197585 A1 | | 10/2003 | Chandrasekaran et al. |
| 2003/0198067 A1 | | 10/2003 | Sun et al. |
| 2004/0051616 A1 | | 3/2004 | Kiko et al. |
| 2004/0113741 A1 | | 6/2004 | Li et al. |
| 2004/0140877 A1 | | 7/2004 | Nakao et al. |
| 2004/0160298 A1 | | 8/2004 | Hsu et al. |
| 2004/0239470 A1 | | 12/2004 | Lu |
| 2005/0024179 A1 | | 2/2005 | Chandrasekaran et al. |
| 2005/0024838 A1 | | 2/2005 | Maxwell |
| 2005/0151614 A1 | | 7/2005 | Dadafshar |
| 2005/0174208 A1 | | 8/2005 | Sato et al. |
| 2005/0286270 A1 | | 12/2005 | Petkov et al. |
| 2006/0038549 A1 | | 2/2006 | Mehrotra et al. |
| 2006/0038650 A1 | | 2/2006 | Mehrotra et al. |
| 2006/0145800 A1 | | 7/2006 | Dadafshar et al. |
| 2006/0187684 A1 | | 8/2006 | Chandrasekaran et al. |
| 2006/0197510 A1 | | 9/2006 | Chandrasekaran |
| 2006/0250205 A1 | | 11/2006 | De et al. |
| 2007/0258213 A1 | | 11/2007 | Chen et al. |
| 2007/0273349 A1 | | 11/2007 | Wei et al. |
| 2007/0285200 A1 | | 12/2007 | Hsieh |
| 2008/0067990 A1 | | 3/2008 | Wei |
| 2008/0309299 A1 | | 12/2008 | Wei et al. |
| 2008/0315982 A1 | | 12/2008 | Wei et al. |
| 2009/0045785 A1 | | 2/2009 | Xiao et al. |
| 2009/0059546 A1 | | 3/2009 | Xing |
| 2009/0108821 A1 | | 4/2009 | Standing |

OTHER PUBLICATIONS

Dixon (1993) "Coupled Inductor Design", Unitrode Seminar, May 1993, Topic 8.

Finn (2004) "Applications and Equivalent Models for Coupled Inductor Parallel Interleaved Converters", AUPEC 2004, Brisbane, Australia, Sep. 26-29.

Li (2002) "Coupled-Inductor Design Optimization for Fast-Response Low-Voltage DC-DC Converters", IEEE APEC, Mar. 10-14, Dallas, Texas, 2:817-823.

Maksimovic (1998) "Modeling of Cross-Regulation in Converters Containing Coupled Inductors", IEEE APEC, Feb. 15-19, Anaheim, California, 1:350-356.

Park (1997) "Modeling and Analysis of Multi-Interphase Transformers for Connecting Power Converters in Parallel", IEEE PSEC, Jun. 22-27, St. Louis, Missouri, 2:1164-1170.

Wong (2000) "Investigating Coupling Inductors in the Interleaving QSW VRM", IEEE APEC, Feb. 6-10, New Orleans, Louisiana, 2:973-978.

Wu (2006) "Multi-Phase Buck Converter Design with Two-Phase Coupled Inductors", IEEE APEC, Mar. 19-23.

Xu (1996) "Analysis by Finite Element Method of a Coupled Inductor Circuit Used as Current Injection Interface", IEEE Workshop on Computers in Power Electronics, Aug. 11-14, Portland, Oregon.

Jieli Li, et al., "Using Coupled Inductors to Enhance Transient Performance of Multi-Phase Buck Converters", 2004 IEEE, pp. 1289-1293.

Anderson F. Hoke, et al., "An Improved Two-Dimensional Numerical Modeling Method for E-Core Transformers", Thayer School of Engineering.

Xiao et al. (2009) International Journal of Electronics; 96:51.

* cited by examiner

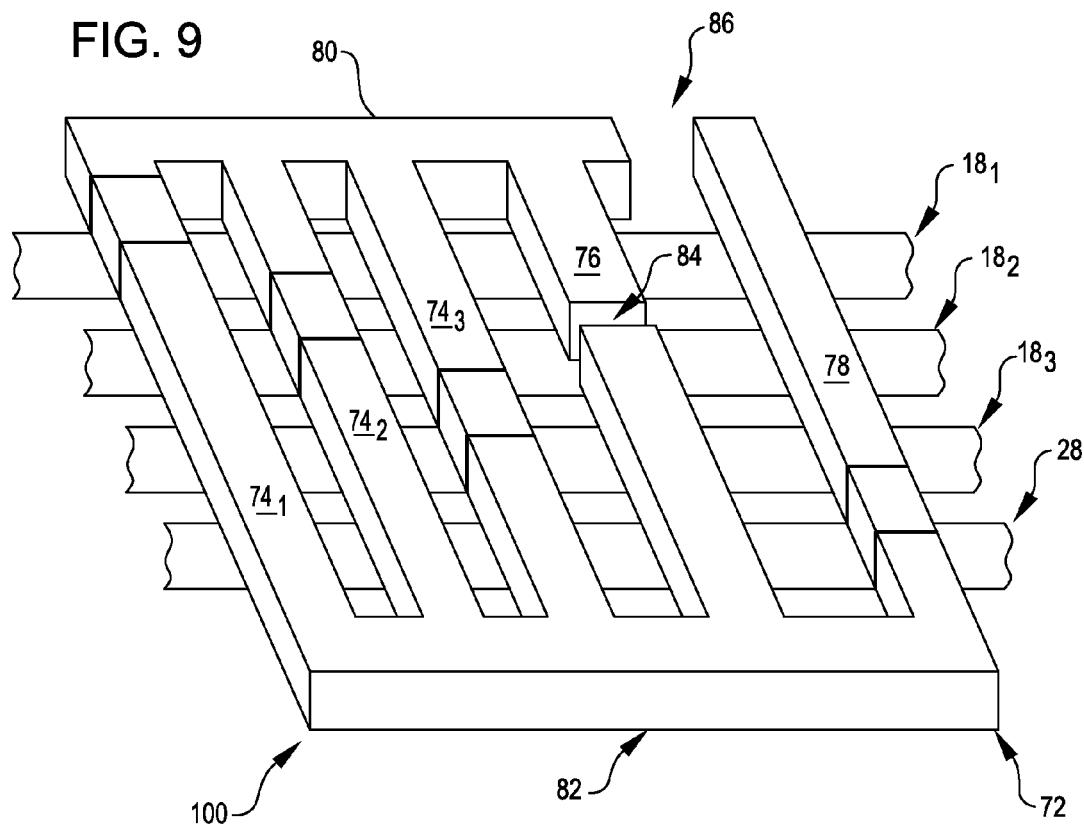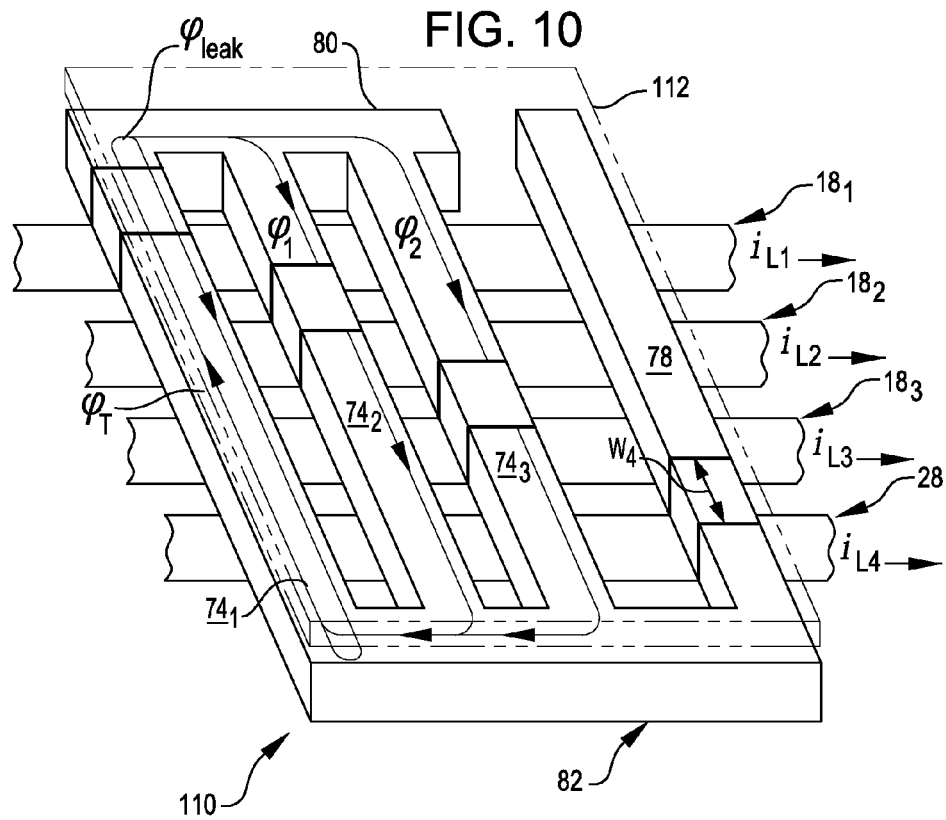

US 8,570,009 B2

1

POWER SUPPLY WITH A MAGNETICALLY UNCOUPLED PHASE AND AN ODD NUMBER OF MAGNETICALLY COUPLED PHASES, AND CONTROL FOR A POWER SUPPLY WITH MAGNETICALLY COUPLED AND MAGNETICALLY UNCOUPLED PHASES

CLAIM OF PRIORITY

The present application claims the benefit of U.S. Provisional Patent Application Ser. No. 60/933,949, filed on Jun. 8, 2007, which application is incorporated by reference in its entirety.

CROSS-RELATED APPLICATIONS

The present application is related to U.S. patent application Ser. Nos. 12/136,023 entitled INDUCTOR ASSEMBLY HAVING A CORE WITH MAGNETICALLY ISOLATED FORMS, filed on Jun. 9, 2008, and 12/136,018 entitled COUPLED-INDUCTOR CORE FOR UNBALANCED PHASE CURRENTS, filed on Jun. 9, 2008; the foregoing applications have a common owner and are incorporated herein by reference in their entireties.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

An embodiment of a power supply includes an input node operable to receive an input voltage, an output node operable to provide a regulated output voltage, an odd number of magnetically coupled phase paths each coupled between the input and output nodes, and a first magnetically uncoupled phase path coupled between the input and output nodes.

Such a power supply may improve its efficiency by activating different combinations of the coupled and uncoupled phases depending on the load conditions. For example, the power supply may activate only an uncoupled phase path during light-load conditions, may activate only coupled phase paths during moderate-load conditions, and may activate both coupled and uncoupled phase paths during heavy-load conditions and during a step-up load transient.

2

Figure 4:
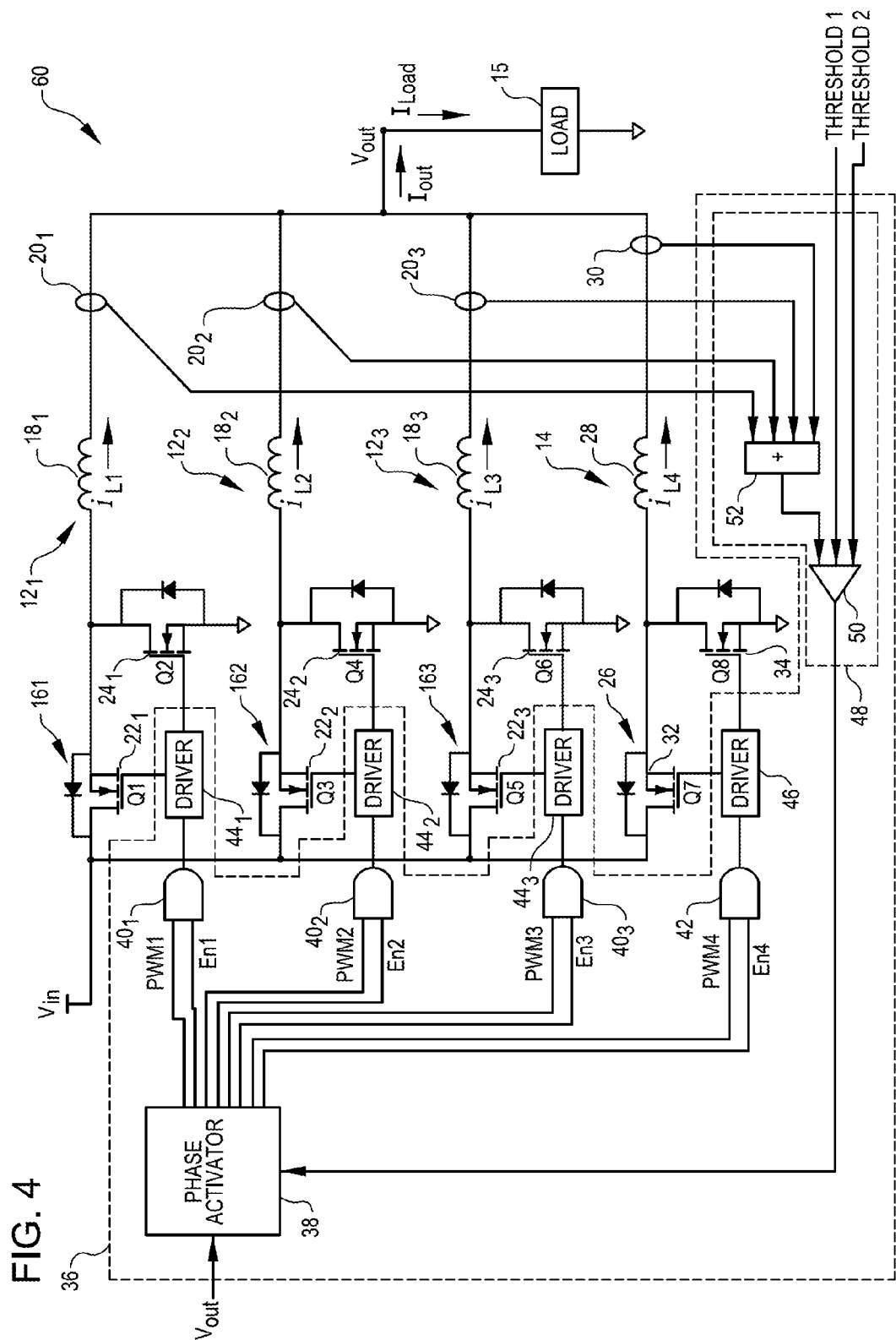
FIG. 4 is a schematic diagram of another embodiment of a multiphase buck converter that includes an odd number of magnetically coupled phase paths and at least one magnetically uncoupled phase path.
Figure 5:
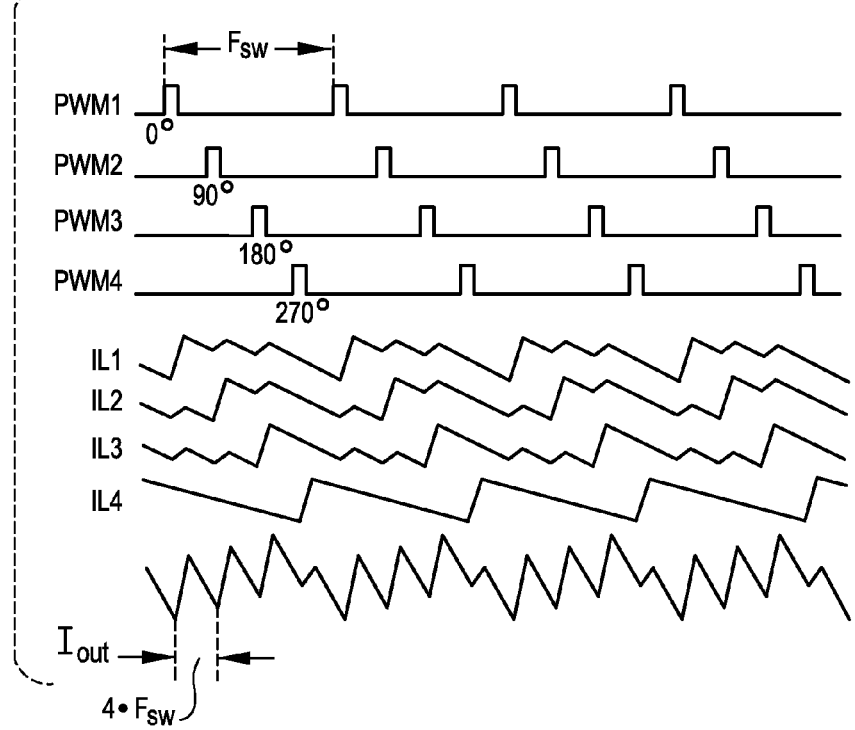

FIG. 5 is a timing diagram of phase switching signals and phase currents generated by the buck converter of FIG. 4 while operating according to the first embodiment of a switching technique.

Figure 6:
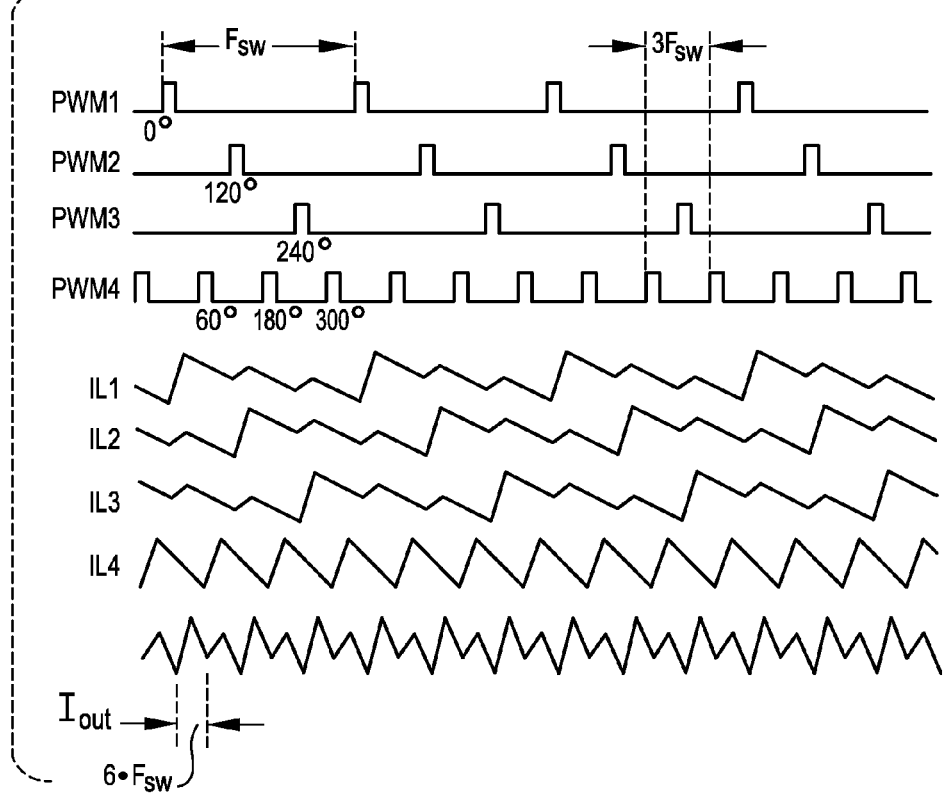

FIG. 6 is a timing diagram of phase switching signals and phase currents generated by the buck converter of FIG. 4 according to the second embodiment of a switching technique.

Figure 7:
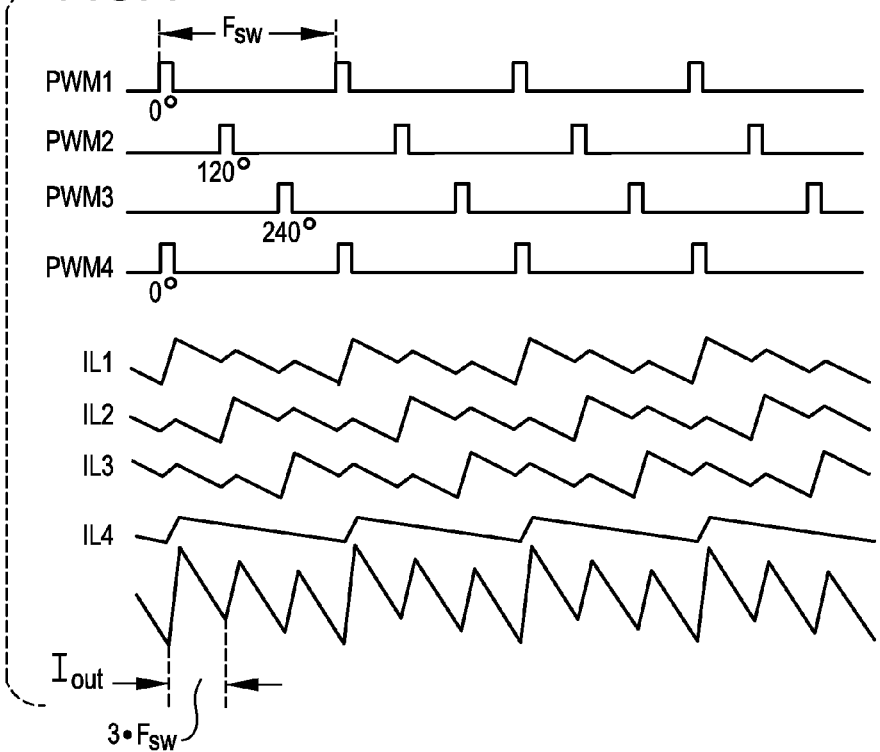

FIG. 7 is a timing diagram of phase switching signals and phase currents generated by the buck converter of FIG. 4 while operating according to a third embodiment of a switching technique.

Figure 1:
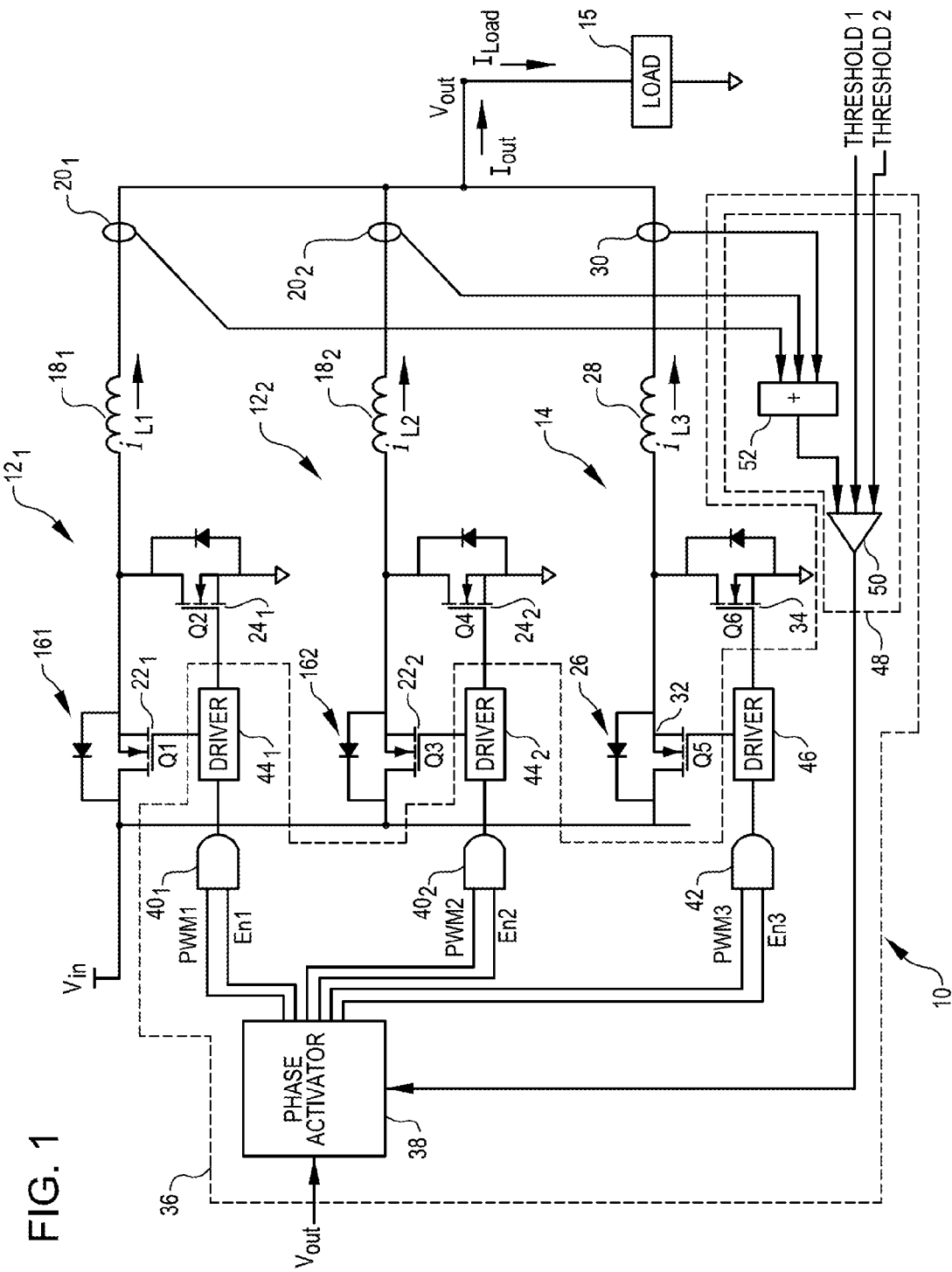
FIG. 1 is a schematic diagram of an embodiment of a multiphase buck converter that includes an even number of magnetically coupled phase paths and a magnetically uncoupled phase path.

FIGS. 8-13 are diagrams of embodiments of inductor assemblies that may provide the phase windings of the buck converters of FIGS. 1 and 4.

Figure 14:
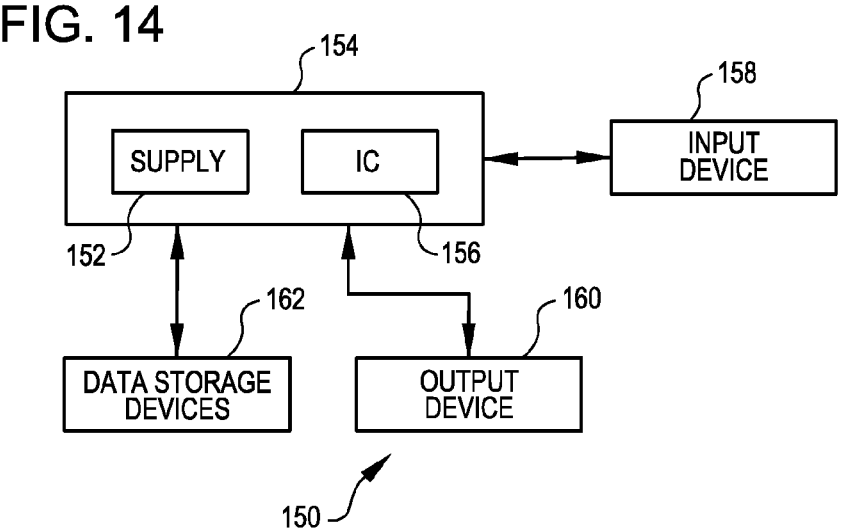

FIG. 14 is a block diagram of a system that may incorporate one or both of the buck converters of FIGS. 1 and 4.

DETAILED DESCRIPTION

Magnetically coupled inductors are used in circuits such as multiphase switching power supplies. For example, using coupled inductors in a multiphase buck converter may allow a designer to reduce the size (e.g., the component count and component values) of the output filter, and thus the size of the converter, for a given transient response and a given amplitude of the output ripple voltage.

Magnetically uncoupled inductors are also used in circuits such as multiphase switching power supplies. Although using uncoupled inductors in a multiphase power supply may increase the size of the supply for a given transient response and for a given amplitude of the output ripple voltage as compared to a coupled-inductor (CI) multiphase supply, an uncoupled-inductor (UI) multiphase supply may be more efficient than a CI multiphase supply under certain load conditions.

FIG. 1 is a schematic diagram of an embodiment of a multiphase buck converter 10, which includes magnetically coupled phases $12_1$-$12_2$ and a magnetically uncoupled phase 14 for driving a load (e.g., an integrated circuit such as a processor) 15 with a regulated output voltage $V_{out}$. As further discussed below, selectively activating the coupled and uncoupled phases 12 and 14 in response to the load may improve the efficiency of the buck converter 10 as compared to purely CI and purely UI converters. Improving the efficiency of the buck converter 10 may not only reduce the amount of energy dissipated by the converter, but, by reducing the amount of heat generated by the converter, may also reduce the amount of energy required to cool a system (e.g., a computer) in which the converter is disposed.

The magnetically coupled phase $12_1$ includes a switching circuit $16_1$, a winding $18_1$, and a current sensor $20_1$. The switching circuit $16_1$ includes a high-side transistor $22_1$ and a low-side transistor $24_1$. The winding $18_1$ includes a conductor that is wound about a magnetically permeable core (not shown in FIG. 1). And the current sensor $20_1$ may be any conventional current sensor, for example, a resistor in series with the winding $18_1$, or a series combination of a resistor and a capacitor in parallel with the winding.

Similarly, the magnetically coupled phase $12_2$ includes a switching circuit $16_2$, a winding $18_2$, and a current sensor $20_2$. The switching circuit $16_2$ includes a high-side transistor $22_2$ and a low-side transistor $24_2$. The winding $18_2$ includes a conductor that is wound about the same magnetically permeable core (not shown in FIG. 1) as is the winding $18_1$. And the current sensor $20_2$ may be similar to the current sensor $20_1$.

The magnetically uncoupled phase 14 includes a switching circuit 26, a winding 28, and a current sensor 30. The switching circuit 26 includes a high-side transistor 32 and a low-side transistor 34. As discussed below in conjunction with FIGS. 8-13, the winding 28 includes a conductor that may be wound about the same core (not shown in FIG. 1) as are the windings $18_1$ and $18_2$. And the current sensor 28 may be similar to the current sensors $20_1$ and $20_2$.

In addition to the phases $12_1$, $12_2$, and 14, the converter 10 includes a power-supply controller 36, which may be disposed on an integrated circuit (IC).

The controller 36 includes a phase activator 38, phase enable circuits (AND gates in the illustrated embodiment) $40_1$, $40_2$, and 42, phase drivers $44_1$, $44_2$, and 46, and a load-current detector 48.

The phase activator 38 generates switching signals PWM1, PWM2, and PWM3 for the phases $12_1$, $12_2$, and 14, respectively, and generates enable signals EN1, EN2, and EN3. If the signal EN1 is logic 1, then the enable circuit $40_1$ allows the switching signal PWM1 to propagate to the driver $44_1$, and thus enables the phase activator 38 to activate the phase $12_1$. Likewise, if the signal EN1 is logic 0, then the enable circuit $40_1$ prohibits the switching signal PWM1 from propagating to the driver $44_1$, and thus disables i.e., deactivates, the phase $12_1$. The enable circuits $40_2$ and 43 operate similarly in response to signals EN2 and EN3, respectively.

The drivers 44 and 46 may each include an inverter. For example, the driver $44_1$ may include an inverter having an input node coupled to the output of the AND gate $40_1$ and to the gate of the high-side transistor $22_1$, and having an output node coupled to the gate of the low-side transistor $24_1$. The inverters of the drivers $44_2$ and 46 may be coupled in a similar manner.

The load-current detector 48 includes a window comparator 50 and a summer 52. The comparator 50 receives from the summer 52, a sum signal representing the total load current $I_{load}$, compares the sum signal to two reference voltages Threshold1 and Threshold2 (Threshold2>Threshold1), and provides the result of the comparison to the phase activator 38. For example, if the sum signal is less than or equal to Threshold1, then the phase activator 38 generates EN1=EN2=logic 0 and EN3=logic 1 to deactivate the coupled phases $12_1$ and $12_2$ and to activate the uncoupled phase 14. If the sum signal is greater than Threshold1 and less than Threshold2, then the phase activator 38 generates EN1=EN2=logic 1 and EN3=logic 0 to activate the coupled phases $12_1$ and $12_2$ and to deactivate the uncoupled phase 14. And, if the sum signal is greater than Threshold2, then the phase activator 38 generates EN1=EN2=EN3=1 to activate all of the phases $12_1$, $12_2$, and 14. The summer 52 may include, for example, a summing node of an operational amplifier (not shown in FIG. 1), and Threshold1 and Threshold2 may be generated externally to the power-supply controller 36, may be generated internally, or may be generated internally and adjustable externally.

The power-supply controller 36 may include other circuitry that is omitted from FIG. 1 for brevity. For example, the controller 36 may include circuitry that causes each of the active ones of the phases $12_1$, $12_2$, and 14 to carry a respective percentage of $I_{load}$. Where such circuitry causes each of the active ones of the phases $12_1$, $12_2$, and 14 to carry equal percentages of $I_{load}$, then the active phases may be described as carrying balanced currents. Examples of such circuitry are described in U.S. Pat. No. 6,278,263, which is incorporated by reference. And where such circuitry causes each of the active ones of the phases $12_1$, $12_2$, and 14 to carry unequal percentages of $I_{load}$, then the active phases may be described as carrying unbalanced currents. Examples of such circuitry are described in U.S. patent application Ser. No. 12/136,018, which is incorporated by reference.

Operation of the multiphase buck converter 10 is discussed according to an example where Threshold1 has a level that corresponds to $I_{load}$~10 Amperes (A), and where Threshold2 has a level that corresponds to $I_{load}$~50 A.

In a first mode of operation where the summing signal from the comparator 52 is between Threshold1 and Threshold2, and thus ~10 A<$I_{load}$<~50 A, the phase activator 38 activates the coupled phases $12_1$ and $12_2$, and deactivates the uncoupled phase 14 such that the converter 10 has its highest efficiency for this range of $I_{load}$. To activate the phases $12_1$ and $12_2$, the phase activator 38 generates EN1=EN2=1 so as to cause the switch circuits $16_1$ and $16_2$ to switch the coupled phases $12_1$ and $12_2$ at a switching frequency and with respective duty cycles sufficient to regulate $V_{out}$ to a specified voltage level, such as 1.8 Volts (V), which is less than an input voltage Vin such as 3.3 V. For example, where the phases have equivalent electrical characteristics and $12_1$ and $12_2$ carry balanced currents, i.e., equal portions (here half) of the average $I_{load}$, and have similar electrical characteristics (e.g., inductance) then the phase activator 38 causes the switching circuits $16_1$ and $16_2$ to switch the phases $12_1$ and $12_2$ with substantially the same duty cycle. And to deactivate the phase 14, the phase activator 38 generates EN3=0 so that the switching circuit 26 puts both the high-side and low-side transistors 32 and 34 in a high-impedance state.

In a second mode of operation where the summing signal is less than or equal to Threshold1 (and thus also less than Threshold2), and thus $I_{load}$≤~10 A, the phase activator 38 deactivates the coupled phases $12_1$ and $12_2$, and activates the uncoupled phase 14 such that the converter 10 has its highest efficiency for this range of $I_{load}$. To activate the phase 14, the phase activator 38 generates EN3=1 so as to cause the switch circuit 26 to switch the uncoupled phase 14 at a switching frequency and with a duty cycle sufficient to regulate $V_{out}$ to the specified voltage level. And to deactivate the coupled phases $12_1$ and $12_2$, the phase activator 38 generates EN1=EN2=0 so that the switching circuits $16_1$ and $16_2$ put both the high-side and low-side transistors $22_1$, $22_2$, $24_1$, and $24_2$ in a high-impedance state.

In a third mode of operation where the summing signal is greater than or equal to Threshold2 (and thus also greater than Threshold1), and thus $I_{load}$≥~50 A, the phase activator 38 activates the coupled phases $12_1$ and $12_2$ and the uncoupled phase 14 such that the converter 10 has its highest efficiency for this range of $I_{load}$. To activate the phases $12_1$, $12_2$, and 14, the phase activator 38 generates EN1=EN2=EN3=1 so as to cause the switch circuits $16_1$, $16_2$, and 26 to switch each of the phases $12_1$, $12_2$, and 14 at respective switching frequencies and with respective duty cycles sufficient to regulate $V_{out}$ to the specified voltage level.

Still referring to FIG. 1, in summary, by selectively activating the coupled phases $12_1$ and $12_2$ and the uncoupled phase 14 in response to the level of $I_{load}$, the phase activator 38 may allow the converter 10 to operate at its highest efficiency for each identifiable load level.

Alternate embodiments of the multiphase buck converter 10 are contemplated. For example, although the converter 10 is described as having two coupled phases $12_1$ and $12_2$ and a single uncoupled phase 14, the converter may have more than two coupled phases and more than one uncoupled phase—an example of a multiphase buck converter having three coupled phases and a single uncoupled phase is described below in conjunction with FIG. 4. Furthermore, although shown as being external to the power-supply controller 36, the transistors 22, 24, 32, and 34 may be disposed on the same IC as the other components of the controller 36, as may be any of the other components (e.g., windings 18, current sensors 20) of the converter 10 shown external to the controller in FIG. 1. Moreover, instead of activating or deactivating all of the coupled phases 12 together, the phase activator 38 may activate fewer than all of the coupled phases (with or without an active uncoupled phase) in response to more than two threshold levels. A technique for activating fewer than all coupled phases is disclosed in U.S. patent application Ser. No. 11/519, 516, filed Sep. 12, 2006, which is incorporated by reference. In addition, although described in conjunction with a buck converter, the above-described concepts for selectively activating coupled and uncoupled phases may be useful in any type of multiphase power supply. Furthermore, although the buck converter 10 is described as having a pulse-width-modulated (PWM) architecture, the converter may have another switching architecture such as a constant-on-time architecture. Moreover, the detector 48 may be omitted, and the load 15 may provide a load signal to the phase activator 38, the load signal indicating the load level. For example, the load signal may be similar to the signal that would otherwise be generated by the comparator 50. Or, the load 15 may provide the load signal even when the detector 48 is present. In either case, the load signal may give the phase activator 38 advance notice of a significant load change that will cause the phase activator to activate a combination of CI and UI phases different from the current combination. Therefore, in response to the load signal, the phase activator 38 may begin to change the combination of active phases before the load 15 changes, and thus may reduce or eliminate load-transient-induced overshoot and undershoot on $V_{out}$. In addition, the phase-enable circuits 40 and 42 may include circuitry other than, or in addition to, NAND gates. Furthermore, although shown as MOS transistors, the transistors 22, 24, 32, and 34 may be bipolar transistors, or the transistors 24 and 34 may be replaced with diodes.

Figure 2:
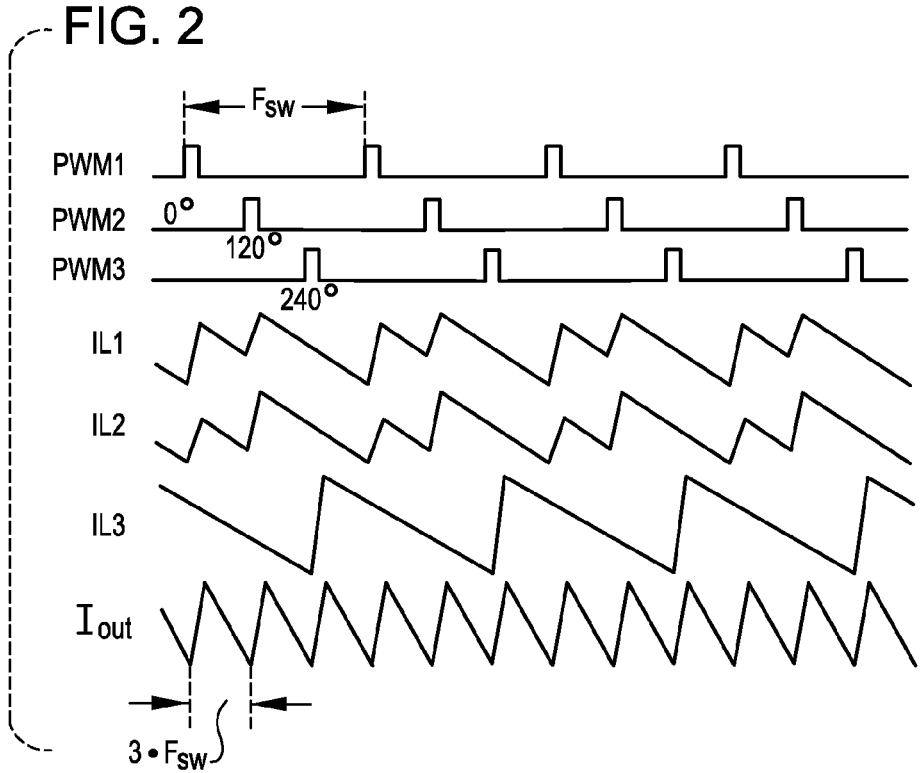
FIG. 2 is a timing diagram of phase switching signals and phase currents generated by the buck converter of FIG. 1 while operating according to a first embodiment of a switching technique.

FIG. 2 is a timing diagram of the signals PWM1, PWM2, and PWM3 of FIG. 1, the respective phase currents IL1, IL2, and IL3 through the phases $12_1$, $12_2$, and 14 of FIG. 1, and $I_{load}$ while the converter 10 is operating in the above-described third mode and according to a first embodiment of a switching technique. These signals may not be drawn to scale, however. Furthermore, in this example, the signals PWM1, PWM2, and PWM3 (or amplified versions thereof) respectively drive high-side transistors $22_1$, $22_2$ and 32, and the inverses of the signals respectively drive the low-side transistors $24_1$, $24_2$, and 34. Moreover, although shown as having the same duty cycle, the signals PWM1, PWM2, and PWM3 may have different duty cycles.

Referring to FIGS. 1 and 2, the phase activator 38 implements this switching technique by causing the switching circuits $16_1$, $16_2$, and 26 to switch the active ones of the phases $12_1$, $12_2$, and 14 at a frequency $F_{sw}$ and at relative phase shifts of 360°/NA, where NA=number of active coupled and uncoupled phases. For example, during the third operating mode when all three phases $12_1$, $12_2$, and 14 are active, the switching circuits $16_1$, $16_2$, and 26 switch the phases at relative phase shifts of 0°, 120°, and 240° as shown in FIG. 2. During the second operating mode when only the two coupled phases $12_1$ and $12_2$ are active, then the switching circuits $16_1$ and $16_2$ switch the coupled phases at frequency $F_{sw}$ and relative phase shifts of 0° and 180°. And during the first operating mode when only the uncoupled phase 14 is active, then the switching circuit 26 switches the uncoupled phase at frequency $F_{sw}$.

With this switching technique, the ripple frequency of $I_{load}$, and thus the ripple frequency of $V_{out}$, approximately equals $NA \cdot F_{sw}$.

Still referring to FIG. 2, alternate embodiments of the described switching technique are contemplated. Two or more of the active ones of the phases $12_1$, $12_2$, and 14 may be switched at the same relative phase shifts. For example, during the third operating mode of the converter 10 (FIG. 1) while all of the phases $12_1$, $12_2$, and 14 are active, the phase 14 may be switched with the same relative phase shifts as phase $12_1$ or phase $12_2$. That is, PWM3 may be aligned in time with PWM1 or PWM2. Moreover, although the converter 10 includes only two coupled phases and one uncoupled phase, the described switching technique may be scaled for more than two coupled phases and for more than one uncoupled phase.

Figure 3:
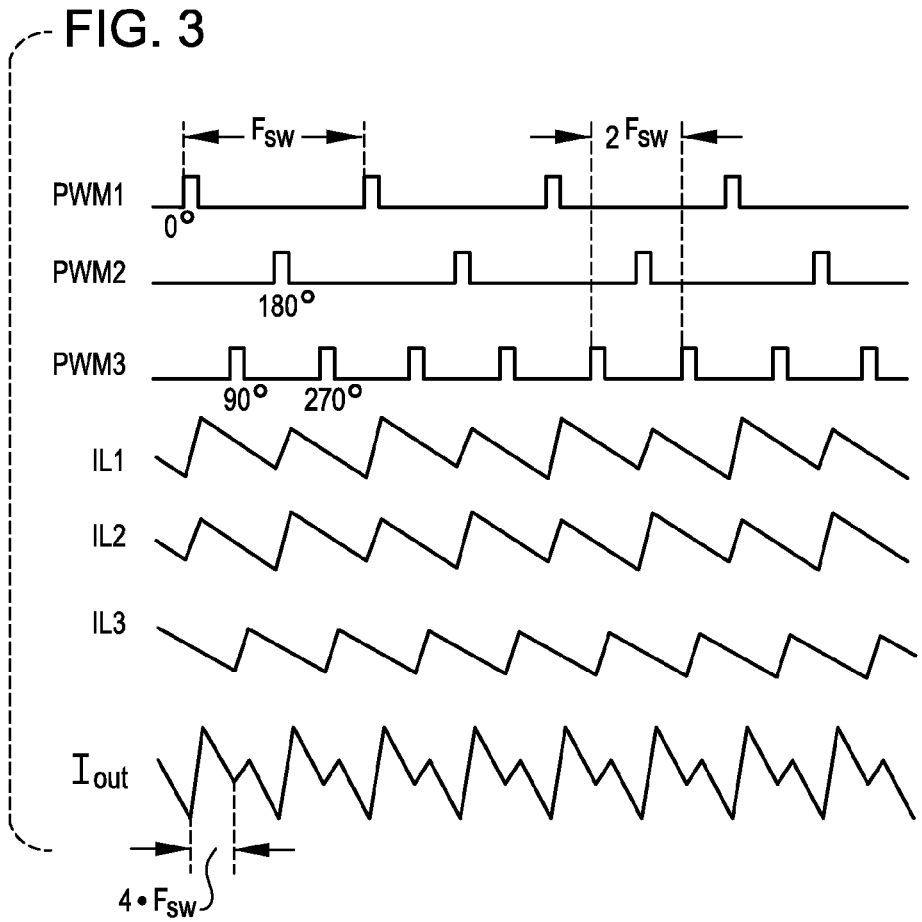
FIG. 3 is a timing diagram of phase switching signals and phase currents generated by the buck converter of FIG. 1 while operating according to a second embodiment of a switching technique.

FIG. 3 is a timing diagram of the signals PWM1, PWM2, and PWM3 of FIG. 1, the respective phase currents IL1, IL2, and IL3 through the phases $12_1$, $12_2$, and 14 of FIG. 1, and $I_{load}$ while the converter 10 of FIG. 1 is operating in the above-described third mode and according to a second embodiment of a switching technique. And as discussed above in conjunction with FIG. 3, these signals may not be drawn to scale, and PWM1, PWM2, and PWM3 may have a different duty cycles and respectively drive the high-side transistors $22_1$, $22_2$, and 32.

Referring to FIGS. 1 and 3, the phase activator 38 implements the second embodiment of a switching technique by causing the switching circuits $16_1$ and $16_2$ to switch the phases $12_1$ and $12_2$ at a frequency $F_{sw}$ and at relative phase shifts of 360°/NAC, where NAC=the number of active coupled phases, and by causing the switching circuit 26 to switch the phase 14 at a frequency equal to $NAC \cdot F_{sw}$ and at phase shifts relative to $F_{sw}$ of 360°/2(NAC). That is, the high-side transistor 32 switches "on" the phase 14 at times that are approximately centred between the times that the transistors $22_1$ and $22_2$ switch "on" the phases $12_1$ and $12_2$. For example, during the third mode of operation when all three phases $12_1$, $12_2$, and 14 are active, the switching circuits $16_1$ and $16_2$ switch the phases $12_1$ and $12_2$ at $F_{sw}$ and at relative phase shifts of 0° and 180°, and the switching circuit 26 switches the phase 14 at 2 $F_{sw}$ and at relative phase shifts of 90° and 270° as shown in FIG. 3. During the second operating mode when only the two coupled phases $12_1$ and $12_2$ are active, the switching circuits $16_1$ and $16_2$ switch the coupled phases at frequency $F_{sw}$ and at relative phase shifts of 0° and 180°. And during the first operating mode when only the uncoupled phase 14 is active, then the switching circuit 26 switches the uncoupled phase at frequency $F_{sw}$, or, alternatively, at 2 $F_{sw}$.

With the second switching technique, the ripple frequency of $I_{load}$, and thus the ripple frequency of $V_{out}$, approximately equals $2 NAC \cdot F_{sw}$. Also, in the third operating mode when all of the phases $12_1$, $12_2$, and 14 are active, the ripple amplitude of $I_{load}$, and thus the ripple amplitude of $V_{out}$, may be less than when the converter 10 operates according to the first embodiment of the switching technique as discussed above in conjunction with FIG. 2.

Still referring to FIG. 3, alternate embodiments of the second switching technique are contemplated. For example, the phase 14 may be switched on at approximately the same times that the phases $12_1$ and $12_2$ are switched on; in the embodiment of FIG. 3, this may be accomplished by shifting PWM3 by 90° relative to $F_{sw}$, which would reduce the frequency of the $I_{load}/V_{out}$ ripple to 2 $F_{sw}$. Moreover, although the converter 10 of FIG. 1 includes only two coupled phases and one uncoupled phase, the second switching technique may be scaled for more than two coupled phases and for more than one uncoupled phase. Furthermore, the alternate embodiments discussed above in conjunction with FIG. 2 for the first switching technique may also be applicable to the second switching technique.

FIG. 4 is a schematic diagram of an embodiment of a multiphase buck converter 60, which is similar to the buck converter 10 of FIG. 1 except that it includes an odd number (here three) of magnetically coupled phases $12_1$-$12_3$ instead of two coupled phases. In FIG. 4, like numbers reference like components relative to the buck converter 10 of FIG. 1. As discussed above in conjunction with FIG. 1 and as further discussed below, selectively activating the coupled and uncoupled phases 12 and 14 in response to the load 15 may improve the efficiency of the buck converter 60 as compared to purely CI and purely UI buck converters.

Operation of the converter 60 is discussed according to an example where Threshold1 has a level that corresponds to $I_{load}$~10 A, and where Threshold2 has a level that corresponds to $I_{load}$~50 A.

In a first mode of operation where the summing signal from the comparator 52 is between Threshold1 and Threshold2, and thus ~10 A<$I_{load}$<~50 A, the phase activator 38 activates the coupled phases $12_1$, $12_2$, and $12_3$, and deactivates the uncoupled phase 14 such that the converter 60 has its highest efficiency for this range of $I_{load}$. To activate the phases $12_1$-$12_3$, the phase activator 38 generates EN1=EN2=EN3=1 so as to cause the switch circuits $16_1$-$16_3$ to switch the coupled phases $12_1$-$12_3$ at a switching frequency and with respective duty cycles sufficient to regulate $V_{out}$ to a specified voltage level, such as 1.8 V, which is less than an input voltage Vin such as 3.3 V. For example, where the phases $12_1$-$12_3$ carry balanced currents and have similar electrical characteristics, then the phase activator 38 causes the switching circuits $16_1$-$16_3$ to switch the phases $12_1$-$12_3$ with substantially the same duty cycle. And to deactivate the phase 14, the phase activator 38 generates EN4=0 so that the switching circuit 26 puts both the high-side and low-side transistors 32 and 34 in a high-impedance state.

In a second mode of operation where the summing signal is less than or equal to Threshold1 (and thus also less than Threshold2), and thus $I_{load}$≤~10 A, the phase activator 38 deactivates the coupled phases $12_1$-$12_3$, and activates the uncoupled phase 14 such that the converter 60 has its highest efficiency for this range of $I_{load}$. To activate the phase 14, the phase activator 38 generates EN4=1 so as to cause the switch circuit 26 to switch the uncoupled phase 14 at a switching frequency and with a duty cycle sufficient to regulate $V_{out}$ to the specified voltage level. And to deactivate the coupled phases $12_1$-$12_3$, the phase activator 38 generates EN1=EN2=EN3=0 so that the switching circuits $16_1$-$16_3$ put the high-side and low-side transistors $22_1$, $22_2$, $22_3$, $24_1$, $24_2$, and $24_3$ in a high-impedance state.

In a third mode of operation where the summing signal is greater than or equal to Threshold2 (and thus also greater than Threshold1), and thus $I_{load}$≥~50 A, the phase activator 38 activates the coupled phases $12_1$-$12_3$ and the uncoupled phase 14 such that the converter 60 has its highest efficiency for this range of $I_{load}$. To activate the phases $12_1$-$12_3$ and 14, the phase activator 38 generates EN1=EN2=EN3=EN4=1 so as to cause the switch circuits $16_1$-$16_3$ and 26 to switch each of the phases $12_1$-$12_3$ and 14 at respective switching frequencies and with respective duty cycles sufficient to regulate $V_{out}$ to the specified voltage level.

Still referring to FIG. 4, in summary, by selectively activating the coupled phases $12_1$-$12_3$ and the uncoupled phase 14 in response to the level of $I_{load}$, the phase activator 38 may allow the converter 60 to operate at its highest efficiency for each identifiable load level.

Furthermore, alternate embodiments of the multiphase buck converter 60 are contemplated. For example, although the converter 60 is described as having three coupled phases $12_1$-$12_3$ and a single uncoupled phase 14, the converter may have more than three coupled phases and more than one uncoupled phase. Furthermore, the alternate embodiments described above for the buck converter 10 of FIG. 1 may also apply to the buck converter 60.

FIG. 5 is a timing diagram of the signals PWM1, PWM2, PWM3, and PWM4 of FIG. 4, the respective phase currents IL1, IL2, IL3, and IL4 through the phases $12_1$, $12_2$, $12_3$, and 14 of FIG. 4, and $I_{load}$ while the converter 60 is operating in the above-described third mode and according to the first embodiment of a switching technique. These signals may not be drawn to scale, and PWM1-PWM4 may have different duty cycles and respectively drive the high-side transistors $22_1$-$22_3$ and 32, respectively.

Referring to FIGS. 4 and 5, the phase activator 38 implements this switching technique by causing the switching circuits $16_1$, $16_2$, $16_3$, and 26 to switch the active ones of the phases $12_1$, $12_2$, $12_3$, and 14 at a frequency $F_{sw}$ and at relative phase shifts of 360°/NA, where NA=number of active coupled and uncoupled phases. For example, during the third operating mode when all four phases $12_1$, $12_2$, $12_3$, and 14 are active, the switching circuits $16_1$, $16_2$, $16_3$, and 26 switch the phases at relative phase shifts of 0°, 90°, 180°, and 270° as shown in FIG. 5. During the second operating mode when only the three coupled phases $12_1$, $12_2$, and $12_3$ are active, then the switching circuits $16_1$-$16_3$ switch the coupled phases at frequency $F_{sw}$ and relative phase shifts of 0°, 120°, and 240°. And during the first operating mode when only the uncoupled phase 14 is active, then the switching circuit 26 switches the uncoupled phase at frequency $F_{sw}$.

With this switching technique, the ripple frequency of $I_{load}$, and thus the ripple frequency of $V_{out}$, approximately equals NA·$F_{sw}$.

Still referring to FIG. 5, alternate embodiments of the described switching technique are contemplated. For example, the alternate embodiments described above in conjunction with FIGS. 2 and 3 may be applicable.

FIG. 6 is a timing diagram of the signals PWM1, PWM2, PWM3, and PWM4 of FIG. 1, the respective phase currents IL1, IL2, IL3, and IL4 through the phases $12_1$, $12_2$, $12_3$, and 14 of FIG. 4, and $I_{load}$ while the converter 60 of FIG. 1 is operating in the above-described third mode and according to a second embodiment of a switching technique. These signals may not be drawn to scale, and PWM1, PWM2, PWM3, and PWM4 may have different duty cycles and respectively drive the high-side transistors $22_1$-$22_3$ and 32, respectively.

Referring to FIGS. 4 and 6, the phase activator 38 implements the second embodiment of a switching technique by causing the switching circuits $16_1$, $16_2$, and $16_3$ to switch the phases $12_1$, $12_2$, and $12_3$ at a frequency $F_{sw}$ and at relative phase shifts of 360°/NAC, where NAC=the number of active coupled phases, and by causing the switching circuit 26 to switch the phase 14 at a frequency equal to NAC·$F_{sw}$ and at a phase shifts relative to $F_{sw}$ of 360°/2(NAC). That is, the high-side transistor 32 switches "on" the phase 14 at times that are approximately centred between the times that the circuits switches $22_1$-$22_3$ switch "on" the phases $12_1$, $12_2$, and $12_3$. For example, during the third mode of operation when all four phases $12_1$, $12_2$, $12_3$, and 14 are active, the switching circuits $16_1$, $16_2$, and $16_3$ switch the phases $12_1$, $12_2$, and $12_3$ at $F_{sw}$ and at a relative phase shifts of 0°, 120°, and 240°, and the switching circuit 26 switches the phase 14 at 3 $F_{sw}$ and at a relative phase shifts of 60°, 180°, and 300° as shown in FIG. 6. During the second operating mode when only the three coupled phases $12_1$, $12_2$, and $12_3$ are active, the switching circuits $16_1$, $16_2$, and $16_3$ switch the coupled phases at frequency $F_{sw}$ and at relative phase shifts of 0°, 120°, and 240°. And during the first operating mode when only the uncoupled phase 14 is active, then the switching circuit 26 switches the uncoupled phase at frequency $F_{sw}$, or, alternatively, at 2 $F_{sw}$ or 3 $F_{sw}$.

With the second switching technique, the ripple frequency of $I_{load}$, and thus the ripple frequency of $V_{out}$, approximately equals 2 NAC·$F_{sw}$. Also, in the third operating mode when all of the phases $12_1$-$12_3$ and 14 are active, the ripple amplitude of $I_{load}$ and $V_{out}$ may be less than when the converter 60 operates according to the first embodiment of the switching technique.

Still referring to FIG. 6, alternate embodiments of the second switching technique are contemplated. For example the phase 14 may be switched on at approximately the same times that the phases $12_1$, $12_2$, and $12_3$ are switched on; in the embodiment of FIG. 6, this may be accomplished by shifting PWM4 by 60° relative to $F_{sw}$, which would reduce the frequency of the $I_{load}/V_{out}$ ripple to 3 $F_{sw}$. Moreover, although the converter 60 of FIG. 4 includes only three coupled phases and one uncoupled phase, the second switching technique may be scaled for more or fewer than three coupled phases and for more than one uncoupled phase. Furthermore, the alternate embodiments discussed above in conjunction with FIGS. 2, 3, and 5 may also be applicable.

FIG. 7 is a timing diagram of the signals PWM1, PWM2, PWM3, and PWM4 of FIG. 4, the respective phase currents IL1, IL2, IL3, and IL4 through the phases $12_1$, $12_2$, $12_3$, and 14 of FIG. 4, and $I_{load}$ while the converter 60 of FIG. 1 is operating in the above-described third mode and according to a third embodiment of a switching technique. These signals may not be drawn to scale, and PWM1, PWM2, PWM3, and PWM4 may have different duty cycles and respectively drive the high-side transistors $22_1$-$22_3$ and 32, respectively.

Referring to FIGS. 4 and 7, the phase activator 38 of FIG. 4 implements the third embodiment of the switching technique by causing the switching circuits $16_1$, $16_2$, $16_3$, and 26 to switch the phases $12_1$, $12_2$, $12_3$ at a frequency $F_{sw}$ and at relative phase shifts of 360°/NAC, where NAC=number of active coupled phases, and by causing the switching circuit 26 to switch the uncoupled phase 14 at $F_{sw}$ and at the same relative phase shift as one of the coupled phases. For example, during the third operating mode when all four phases $12_1$, $12_2$, $12_3$, and 14 are active, the switching circuits $16_1$, $16_2$, $16_3$, and 26 switch the phases $12_1$-$12_3$ at relative phase shifts of 0°, 120°, 240° and the phase 14 at a relative phase shift of 0° (the same relative phase shift as the phase $12_1$) as shown in FIG. 7. During the second operating mode when only the three coupled phases $12_1$, $12_2$, and $12_3$ are active, then the switching circuits $16_1$-$16_3$ switch the coupled phases at frequency $F_{sw}$ and at relative phase shifts of 0°, 120°, and 240°. And during the first operating mode when only the uncoupled phase 14 is active, the switching circuit 26 switches the uncoupled phase at frequency $F_{sw}$.

With the third switching technique, the ripple frequency of $I_{load}$, and thus the ripple frequency of $V_{out}$, approximately equals NAC·$F_{sw}$.

Still referring to FIG. 7, alternate embodiments of the third switching technique are contemplated. For example, the third switching technique may be scaled for numbers of coupled phases greater than or less than three and for numbers of uncoupled phases greater than one. Furthermore, alternate embodiments described above in conjunction with FIGS. 2, 3, 5, and 6 may be applicable.

Figure 8:
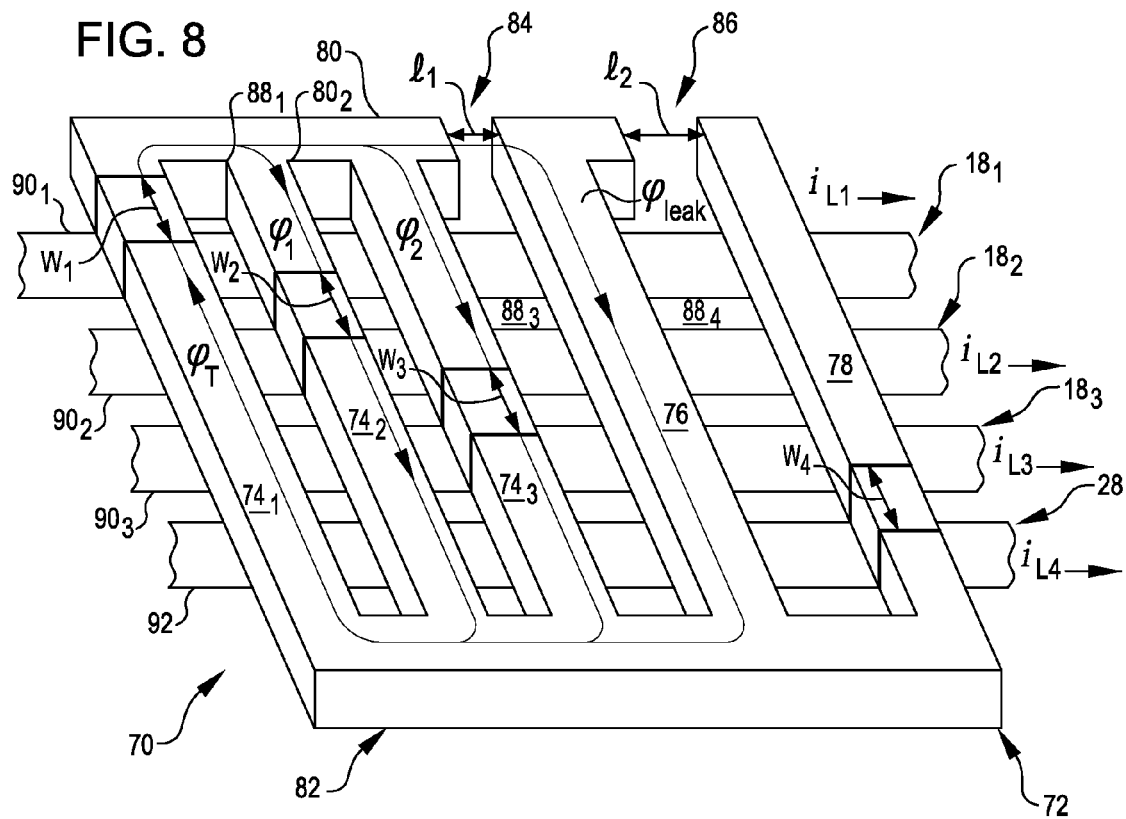

FIG. 8 is an isometric view of an inductor assembly 70 that may include a common core 72 for the magnetically coupled windings 18 and the magnetically uncoupled winding 28 of the buck converters 10 and 60 of FIGS. 1 and 4. For purposes of illustration, the assembly 70 is described as including the windings $18_1$-$18_3$ and 28 of the buck converter 60. Including a common core for coupled and uncoupled windings may reduce the cost of, and the layout area occupied by, the windings as compared to using separate cores for the coupled and uncoupled windings.

The common core 72 includes magnetically coupled winding forms $74_1$-$74_3$, an optional leakage form 76, a magnetically uncoupled winding form 78, and members 80 and 82, which interconnect the forms. That is, using a ladder analogy, the forms $74_1$-$74_3$, 76, and 78 are the rungs of the ladder, and the members 80 and 82 are the rails to which the rungs are coupled. The member 80 includes an optional first gap 84 and a second gap 86. And spaces $88_1$-$88_4$ separate the forms $74_1$-$74_3$, 76, and 78.

The forms $74_1$-$74_3$ may have the same cross-sectional dimensions and be made from the same material, for example, where the windings $18_1$-$18_3$ carry balanced portions of the load current $I_{load}$.

Alternatively the forms $74_1$-$74_3$ may have different dimensions or be made of different materials, for example, where the windings $18_1$-$18_3$ carry unbalanced currents as described in related U.S. patent application Ser. No. 12/136,018.

The first gap 84 and the leakage form 76 cooperate to allow a specified amount of leakage flux $\phi_{leak}$ to flow when a high-side switch 22 or 32 (FIG. 4) couples a respective one of the windings $18_1$-$18_3$ is driven with the input voltage Vin (FIG. 4). The gap 84 has a length l1 and may be partially or fully filled with a material other than air, l1 and the fill material depending on the specified leakage flux $\phi_{leak}$. Likewise, the leakage form 76 has cross-sectional dimensions and is made from a material (which may be different from the material from which the forms 74 are made), the dimensions and material depending on the specified leakage flux $\phi_{leak}$. The leakage flux $\phi_{leak}$ provides an effective filter inductance that the load 15 (FIG. 4) "sees" when the phases $12_1$-$12_3$ are active and the phase 14 is inactive. U.S. patent application Ser. No. 11/903,185 discusses such leakage inductance in more detail.

The second gap 86 has a length l2 (which may be longer or shorter than l1) and may be partially or fully filled with a material other than air to allow at most a negligible amount of flux to flow between any of the forms $74_1$-$74_3$ and the form 78, where a "negligible amount" may be defined for the specific application. For example, the flux flowing from the form $74_1$ to the form 78 via the gap 86 may be negligible if this flux is no more than 1.0% of the total flux $\phi_T$ induced in the form $74_1$ by the current IL1 flowing through the winding $18_1$. Likewise, in this example, the flux flowing from the form 78 to the forms $74_1$-$74_3$ via the gap 86 may be negligible if this flux is no more than 1.0% of the flux induced in the form 78 by the current IL4 (FIGS. 5-7) through the winding 28.

The dimensions and material of the form 78 may be selected to give the magnetically uncoupled winding 28 a specified inductance.

Each winding $18_1$-$18_3$ and 28 is formed from a respective conductor $90_1$-$90_3$ and 92, which has a respective width $W_1$-$W_4$, is partially wound about a corresponding form $74_1$-$74_3$, and 78, and extends beneath and adjacent to the remaining forms. For example, the winding $18_1$ is formed from a conductor $90_1$ that is partially wound about the form $74_1$ and extends beneath and adjacent to the remaining forms $74_2$-$74_3$, 76, and 78. Similarly, the winding $18_2$ is formed from a conductor $90_2$ that is partially wound about the form $74_2$ and extends beneath and adjacent to the remaining forms $74_1$, $74_3$, 76, and 78, and so on. The conductors $90_1$-$90_3$ and 92 may be made from any suitable conductive material such as copper or another metal, and may, but need not be, electrically insulated from the forms $74_1$-$74_3$, 76, and 78. Furthermore, the implications of the conductors $90_1$-$90_3$ and 92 being partially wound about the respective forms $74_1$-$74_3$ and 78 are discussed in U.S. patent application Ser. No. 11/903,185, which is incorporated by reference.

Referring to FIGS. 4 and 8, the operation of the inductor assembly 70 is described when a current IL1 flows from $V_{in}$, trough the transistor $22_1$, and through the winding $18_1$ in the direction shown, it being understood that the operation is similar when a current flows through the other windings $18_2$-$18_3$. For purposes of example, it is assumed that the entire core 72 (the forms $74_1$-$74_3$, 76, and 78 and the members 80 and 82) is formed from the same magnetic material. It is also assumed that the forms $74_1$-$74_3$ have the same dimensions, and that the conductors $90_1$-$90_3$ and 92 have the same widths W. Furthermore, it is assumed that the forms $74_2$-$74_3$ do not pass inside the Faraday loop through which the current IL1 flows. Moreover, it is assumed that the form 76 and the gap 84 are present.

As the current IL1 flows through the winding $18_1$, it generates a total magnetic flux $\phi_T$, which, in a first-order approximation, flows through the form $74_1$—in this approximation, flux flowing outside of the core 72 is presumed to be negligible, and is thus ignored.

A first portion $\phi_1$ of the total flux $\phi_T$ flows through the form $74_2$, a second portion $\phi_2$ of the total flux $\phi_T$ flows through the form $74_3$, and a third portion $\phi_{leak}$ flows through the leakage form 76 such that $\phi_T$ is given by the following equation:

$$\phi_T = \phi_1 + \phi_2 + \phi_{leak} \quad (1)$$

where $\phi_1 = \phi_2$ because the forms $74_2$ and $74_3$ have the same dimensions and are made from the same material, and the reluctance of the portion of the members 80 and 82 between the forms $74_2$ and $74_3$ is assumed to be negligible.

The flux $\phi_1$ induces a current IL2 to flow through the transistor $24_2$ and the winding $18_2$, and the flux $\phi_2$ induces a current IL3 to flow through the transistor $24_3$ and the winding $18_3$.

Because the current IL1 flowing in the winding $18_1$ induces currents IL2 and IL3 in the windings $18_2$ and $18_3$, respectively, the windings $18_1$-$18_3$ are magnetically coupled to one another.

But the gap 86 has a reluctance large enough to allow no more than a negligible portion of $\phi_T$ to flow through the form 78, and, therefore, the current IL1 induces no more than a negligible current in the winding 28.

Similarly, when a current IL4 flows through the transistor 32 and the winding 28 and generates a flux through the form 78, the gap 86 allows no more than a negligible portion of this flux to flow through the form $74_1$, and, therefore, the current IL4 through the winding 28 induces no more than a negligible current in the winding $18_1$.

Consequently, because a current IL1 through the winding $18_1$ effectively induces no current in the winding 28, and because a current driven through the winding 28 effectively induces no current in the winding $18_1$, the winding $18_1$ is magnetically uncoupled from the winding 28. And because an analysis similar to the above analysis holds for the windings $18_2$ and $18_3$, the windings $18_2$ and $18_3$ are also magnetically uncoupled from the winding 28.

Therefore, because the windings $18_1$-$18_3$ are magnetically coupled to one another but magnetically uncoupled from the winding 28, the inductor assembly 70 is electrically equivalent to a first core having the windings $18_1$-$18_3$ and second core separate from the first core and having the winding 28.

But as stated above, the inductor assembly 70 having the common core 72 may be smaller and otherwise less costly than an electrically equivalent multi-core inductor assembly.

Still referring to FIG. 8, alternate embodiments of the inductor assembly 70 are contemplated. For example, although described as including three magnetically coupled windings and one magnetically uncoupled winding, the assembly 70 may be scaled to include more or fewer coupled windings and more uncoupled windings (an alternate embodiment with two coupled windings and one uncoupled winding may be suitable for use in the buck converter 10 of FIG. 1). Furthermore, in some applications one may leave one or more of the windings 18 and 28 uncoupled. Moreover, the leakage form 76 and the gap 84 may be omitted. In addition, the conductors 90 and 92 may be wound about the respective forms 74 and 78 any number of times. Furthermore, one or both of the gaps 84 and 86 may be disposed in the member 82 instead of in the member 80. Moreover, the structure 70 may include multiple leakage forms. In addition, a gap similar to the gap 86 may be disposed on the other side of the form 78, and the members 80 and 82 may be extended to accommodate one or more additional groups of magnetically coupled windings and leakage forms similar to the group including the windings $18_1$-$18_3$ (and forms $74_1$-$74_3$) and leakage form 76, and to accommodate one or more additional uncoupled forms similar to the form 78. Each of these additional groups of coupled windings may include more or fewer than three windings. An example of such an alternate embodiment is described below in conjunction with FIG. 13; moreover, the inductor assembly 70 may be disposed within a package.

FIG. 9 is an isometric view of an inductor assembly 100 in which like numbers reference like components relative to the inductor assembly 70 of FIG. 8.

The inductor assembly 100 may be similar to the inductor assembly 70 of FIG. 8, except that the gap 84 is disposed in the form 76 instead of in the member 80. Forming the gap 84 in the form 76 may increase the structural integrity of the assembly 100 as compared to that of the assembly 70. And although not shown, the gap 86 may be disposed in the form 78.

Alternate embodiments of the inductor assembly 100 are contemplated. For example, the alternate embodiments described above in conjunction with the inductor assembly 70 of FIG. 8 may be applicable to the assembly 100.

FIG. 10 is an isometric view of an inductor assembly 110 in which like numbers reference like components relative to the inductor assembly 70 of FIG. 8.

The inductor assembly 110 may be similar to the inductor assembly 70 of FIG. 8, except that the leakage form 76 and the gap 84 are omitted and replaced with a leakage plate 112 (shown in transparent dashed line) that is disposed over and separated from the core 72.

Therefore, the leakage flux $\phi_{Leak}$ flows through the plate 112 and the gap between the plate and the core 72. The dimensions and material of the plate 112 may be selected to present a leakage-flux path having a specified reluctance to yield specified leakage inductances for the windings $18_1$-$18_3$, and to also provide a specified inductance for the winding 28 (a portion of the flux generated in the form 78 by the current IL4 flowing through the winding 28 may flow through the plate 112, thus affecting the inductance of the winding 28).

An inductor assembly that includes a similar leakage plate is described in U.S. patent application Ser. No. 11/903,185, which is incorporated by reference.

Alternate embodiments of the inductor assembly 110 are contemplated. For example, the plate 112 may be sized so that it is not disposed over all of the forms 74 and 78. For example, the plate 112 may not be disposed over the form 78 so as to have little or no affect on the inductance of the winding 28. Furthermore, the dimensions and material of the plate 112, and the spacing of the plate from the core 72, may vary as a function of location so as to impart to each winding a flux leakage path having characteristics different from those of at least one other flux leakage path. Also, the assembly 110 may include a leakage form such as the leakage form 76 of FIG. 9 in addition to the leakage plate 112. Moreover, the alternate embodiments described above in conjunction with the inductor assemblies 70 and 100 of FIGS. 8 and 9 may be applicable to the assembly 110.

Figure 11:
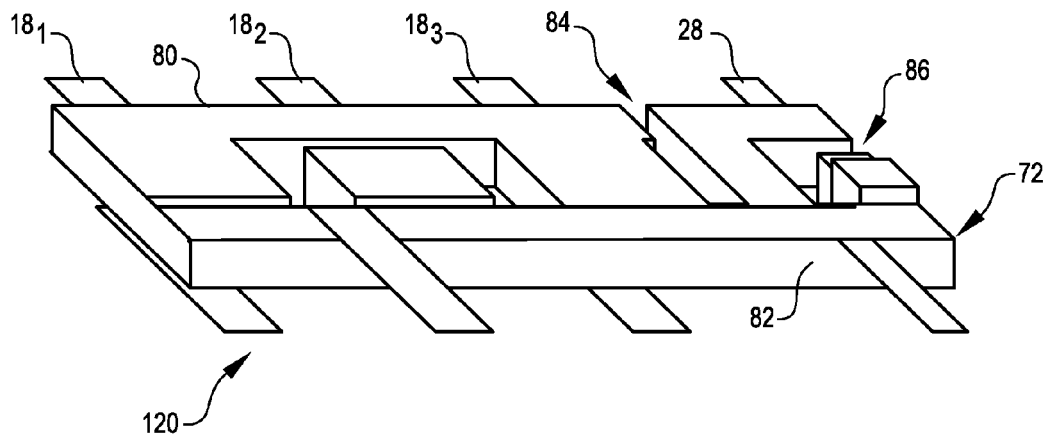

FIG. 11 is an isometric view of an inductor assembly 120 in which like numbers reference like components relative to the inductor assembly 70 of FIG. 8.

The inductor assembly 120 may be similar to the inductor assembly 70 of FIG. 8, except that the windings $18_1$-$18_3$ and 28 extend generally parallel to the forms $74_1$-$74_3$, 76, and 78 instead of generally perpendicular to them, and the gap 86 is disposed in the form 78 instead of in the member 80. A core similar to the core 72 of FIG. 11 is described in U.S. patent application Ser. No. 11/903,185, which is incorporated by reference.

Alternate embodiments of the inductor assembly 120 are contemplated. For example, the gap 84 may be disposed in the form 76 or in the member 82, and the gap 86 may be disposed in the member 80 or the member 82. Furthermore, a leakage plate similar to the leakage plate 112 of FIG. 10 may replace or be included in addition to the leakage form 76. Moreover, the alternate embodiments described above in conjunction with the inductor assemblies 70, 100, and 110 of FIGS. 8-10 may be applicable to the assembly 120.

Figure 12:
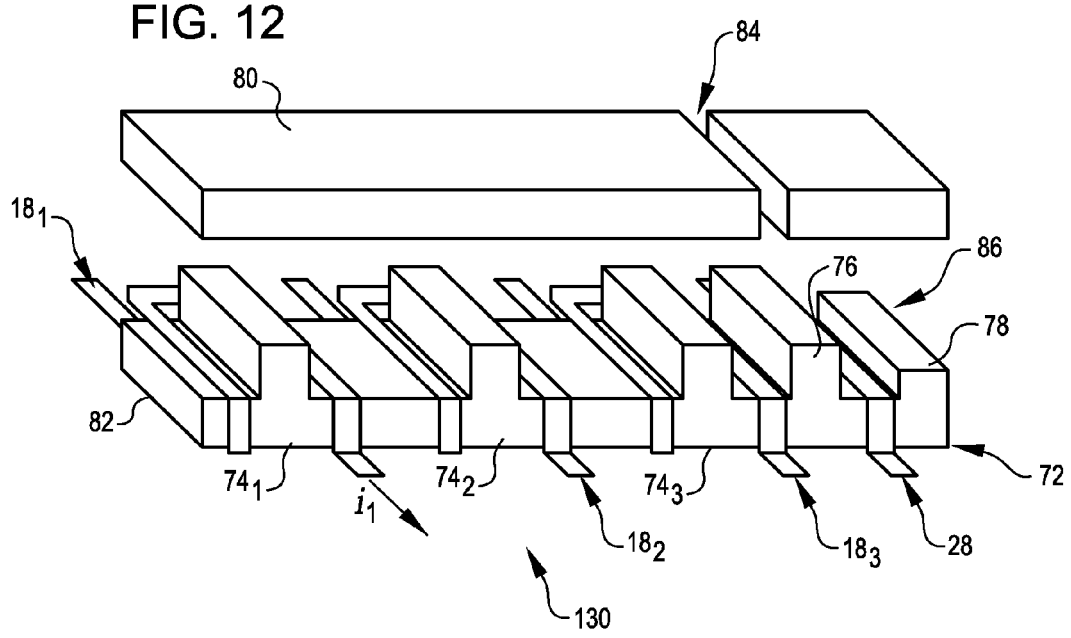

FIG. 12 is an exploded isometric view of an inductor assembly 130 in which like numbers reference like components relative to the inductor assembly 70 of FIG. 8.

The inductor assembly 130 may be similar to the inductor assembly 70 of FIG. 8, except that members 80 and 82 may be wider and closer together, and the windings $18_1$-$18_3$ and 28 may extend generally in parallel with the forms $74_1$-$74_3$, 76, and 78 and be wound about the forms in a plane that is generally parallel to the members 80 and 82. For better viewing, the member 80 is shown exploded from the forms $74_1$-$74_3$, 76, and 78 although the member 80 may be integral with these forms. A core similar to the core 72 of FIG. 12 is described in U.S. patent application Ser. No. 11/903,185, which is incorporated by reference.

Alternate embodiments of the inductor assembly 130 are contemplated. For example, a leakage plate similar to the leakage plate 112 of FIG. 10 may replace or be included in addition to the leakage form 76. Moreover, the alternate embodiments described above in conjunction with the inductor assemblies 70, 100, 110, and 120 of FIGS. 8-11 may be applicable to the assembly 130.

Figure 13:
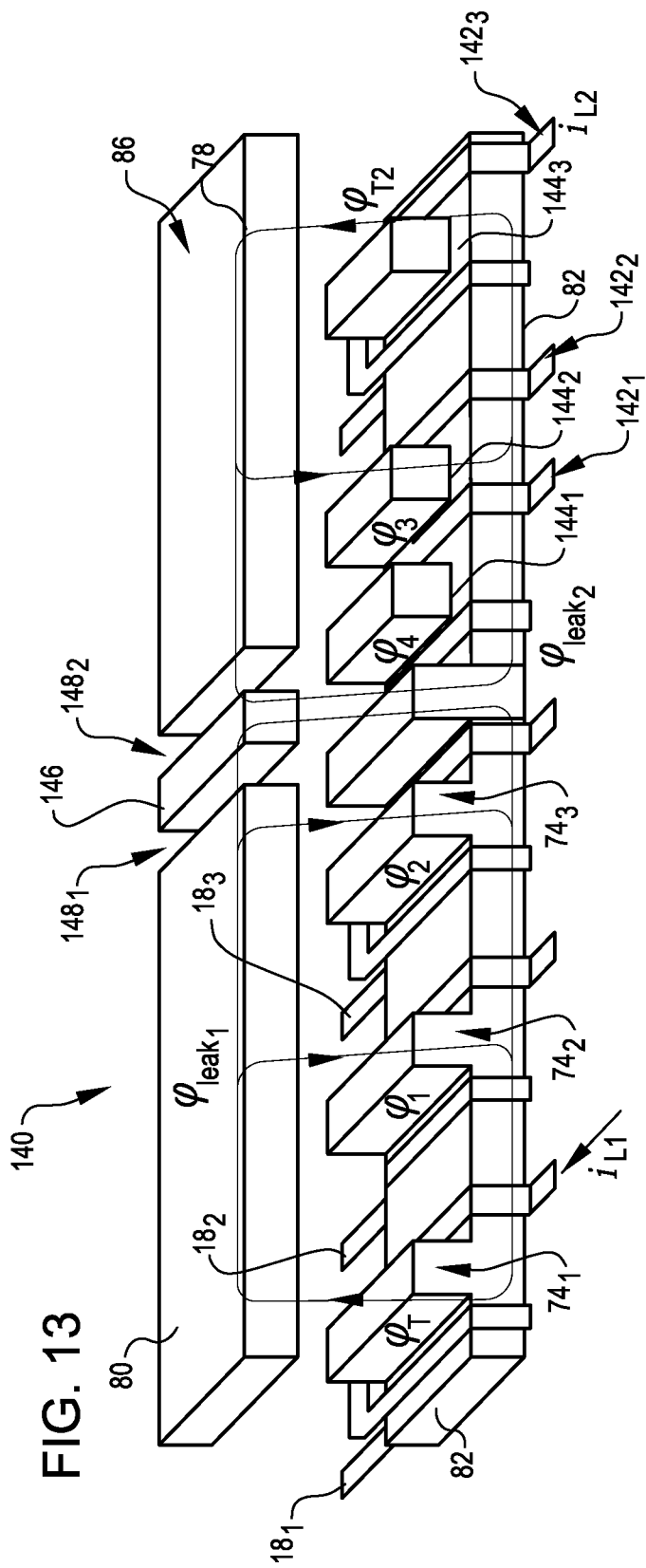

FIG. 13 is an exploded isometric view of an inductor assembly 140 in which like numbers reference like components relative to the inductor assembly 70 of FIG. 8 and to the inductor assembly 130 of FIG. 12.

The inductor assembly 140 may be similar to the inductor assembly 130 of FIG. 13, except that the uncoupled winding 28 is omitted, and a second group of coupled windings $142_1$-$142_3$ are added and are respectively wound about forms $144_1$-$144_3$.

In an embodiment, a form 146 acts as a shared leakage form, and the gaps $148_1$ and $148_2$ magnetically isolate the first group of coupled windings $18_1$-$18_3$ from the second group of coupled windings $142_1$-$142_3$. For example, a current IL1 driven through the winding $18_1$ generates a total flux $\phi_{T1}$ and a leakage flux $\phi_{leak1}$, which circulates through the gap $148_1$ and the form 146. However, the reluctance of the gap $148_2$ allows no more than a negligible portion of the flux $\phi_{T1}$ to circulate through any one of the forms $144_1$-$144_3$. Similarly, a current IL2 driven through the winding $142_1$ generates a total flux $\phi_{T2}$ and a leakage flux $\phi_{leak2}$, which circulates through the gap $148_2$ and the form 146. However, the reluctance of the gap $148_1$ allows no more that a negligible portion of the flux $\phi_{T2}$ to circulate through any one of the forms $74_1$-$74_3$. Alternatively, the form 146 may be replaced with two forms separated by a third gap. In this alternative, the leakage flux $\phi_{leak1}$ would circulate through the form closest to the first group of windings $18_1$-$18_3$, and the leakage flux $\phi_{leak2}$ would circulate through the form closest to the second group of windings $142_1$-$142_2$.

In another embodiment, the form 146 is omitted, and a single gap 148 magnetically isolates the first group of coupled windings $18_1$-$18_3$ from the second group of coupled windings $142_1$-$142_3$. One or more leakage plates similar to the plate 112 of FIG. 10 may be included in the assembly 140 to provide paths for leakage inductance. Or, respective leakage forms, one for each group of coupled windings, may be disposed remote from the single gap 148.

In yet another embodiment, the gaps $148_1$ and $148_2$ may have respective reluctances large enough to allow no more than a negligible flux to flow through either gap and through the form 146. Therefore, because in this embodiment the form 146 is magnetically isolated from the first and second groups of windings $18_1$-$18_3$ and $142_1$-$142_3$, a magnetically uncoupled winding may be wound about the form 146.

Alternative embodiments of the inductor assembly 140 are contemplated. For example, the lengths of the members 80 and 82 may be extended to include more than two magnetically isolated groups of magnetically coupled windings, and to include more leakage forms and uncoupled windings. Furthermore, one or more leakage plates may be included, instead of or in addition to leakage forms. For example, a leakage plate may be included adjacent to one group of windings, and another group may include a leakage form. Or, a leakage plate may be adjacent to a group of coupled windings that also includes a leakage form. Also, a single leakage plate may be adjacent to more than one group of windings. Moreover, alternate embodiments described above in conjunction with the inductor assemblies 70, 100, 110, 120, and 130 of FIGS. 8-12 may be applicable to the assembly 140.

FIG. 14 is a block diagram of a system 150 (here a computer system), which may incorporate a power supply (such as one of the buck converters 10 and 60 of FIGS. 1 and 4) 152 that includes one or more of the inductor assemblies 70, 100, 110, 120, 130, and 140 of FIGS. 8-13.

The system 150 includes computer circuitry 154 for performing computer functions, such as executing software to perform desired calculations and tasks. The circuitry 154 typically includes a controller, processor, or one or more other integrated circuits (ICs) 156, and the power supply 152, which provides power to the IC(s) 156. As discussed above in conjunction with FIGS. 1 and 4, one or more of these ICs may provide a load signal to the power supply 152, which may use this signal to activate a corresponding combination of CI and UI phases. One or more input devices 158, such as a keyboard or a mouse, are coupled to the computer circuitry 154 and allow an operator (not shown) to manually input data thereto. One or more output devices 160 are coupled to the computer circuitry 154 to provide to the operator data generated by the computer circuitry. Examples of such output devices 160 include a printer and a video display unit. One or more data-storage devices 162 are coupled to the computer circuitry 154 to store data on or retrieve data from external storage media (not shown). Examples of the storage devices 162 and the corresponding storage media include drives that accept hard and floppy disks, tape cassettes, compact disk read-only memories (CD-ROMs), and digital-versatile disks (DVDs).

From the foregoing it will be appreciated that, although specific embodiments have been described herein for purposes of illustration, various modifications may be made without deviating from the spirit and scope of the present disclosure. Furthermore, where an alternative is disclosed for a particular embodiment, this alternative may also apply to other embodiments even if not specifically stated.

What is claimed is:

1. A power supply, comprising:
    an input node operable to receive an input voltage;
    an output node operable to provide a regulated output voltage;
    an odd number of magnetically coupled phase paths each coupled between the input and output nodes;
    a first magnetically uncoupled phase path coupled between the input and output nodes; and
    a power-supply controller coupled to the phase paths and operable:
        to activate each of the magnetically coupled phase paths at a first frequency; and
        to activate the magnetically uncoupled phase path at a second frequency that is substantially equal to a product of the first frequency and the odd number.

2. The power supply of claim 1, further comprising:
    an inductor assembly comprising a core having members; and
    wherein each of the magnetically coupled and uncoupled phase paths includes a single winding disposed about a respective one of the members.

3. A power supply, comprising:
    an input node operable to receive an input voltage;
    an output node operable to provide a regulated output voltage;
    an odd number of magnetically coupled phase paths each coupled between the input and output nodes;
    a first magnetically uncoupled phase path coupled between the input and output nodes; and
    an inductor assembly including a core having
        a group of first members that are magnetically coupled to one another, and
        a second member that is magnetically isolated from the first members;
    wherein each of the magnetically coupled phase paths includes a winding disposed about a respective one of the first members; and
    wherein the magnetically uncoupled phase path includes a winding disposed about the second member.

4. The power supply of claim 3, further comprising a second magnetically uncoupled phase path coupled between the input and output nodes.

5. A system, comprising:
    a power supply, comprising,
        an input node operable to receive an input voltage,
        an output node operable to provide a regulated output voltage,
        an odd number of magnetically coupled phase paths each coupled between the input and output nodes, the odd number of magnetically coupled phase paths being magnetically to each other,
        a magnetically uncoupled phase path coupled between the input and output nodes, and
        a power-supply controller coupled to and operable to activate each of the magnetically coupled phase paths at a first frequency and to activate the magnetically uncoupled phase path at a second frequency that is approximately equal to a product of the first frequency and the odd number; and
    a load coupled to the output node of the power supply.

6. The system of claim 5, further comprising:
    an integrated-circuit die; and
    wherein the controller and the load are disposed on the die.

7. The system of claim 5, further comprising:
    first and second integrated-circuit dies;
    wherein the controller is disposed on the first die; and
    wherein the load is disposed on the second die.

8. The system of claim 5 wherein the load comprises an integrated circuit.

9. A method, comprising:
    activating each of an odd number of magnetically coupled phase paths at respective first frequencies, the odd number of magnetically coupled phase paths being magnetically coupled to one another; and
    activating a first magnetically uncoupled phase path at a second frequency that is substantially equal to a product of the first frequency and the odd number.

10. The method of claim 9 wherein activating the magnetically coupled phase paths comprises activating each one of the magnetically coupled phase paths at a phase offset from a respective other one of the magnetically coupled phase paths, the phase offset substantially equal to a quotient of a total number of the magnetically coupled phase paths and 360 degrees.

11. A method, comprising:
    activating each of an odd number of magnetically coupled phase paths at respective first frequencies; and
    activating a first magnetically uncoupled phase path a second frequency;
    wherein the second frequency is substantially equal to a product of the first frequency and the odd number;
    wherein activating the magnetically coupled phase paths comprises activating each one of the magnetically coupled phase paths at a first phase offset from a respective other one of the magnetically coupled phase paths, the phase offset substantially equal to a quotient of a total number of the magnetically coupled phase paths and 360 degrees; and
    wherein activating the magnetically uncoupled phase path comprises activating the magnetically uncoupled phase path at a second phase offset from each of the magnetically coupled phase paths, the second phase offset substantially equal to one half of the first phase offset relative to the first frequency.

12. A method, comprising:
    activating each of an odd number of magnetically coupled phase paths at respective first frequencies; and
    activating a first magnetically uncoupled phase path a second frequency;
    wherein the second frequency is substantially equal to a product of the first frequency and the odd number;

wherein activating the magnetically coupled phase paths comprises activating each one of the magnetically coupled phase paths at a first phase offset from a respective other one of the magnetically coupled phase paths, the phase offset substantially equal to a quotient of a total number of the magnetically coupled phase paths and 360 degrees; and wherein activating the magnetically uncoupled phase path comprises activating the magnetically uncoupled phase path at a second phase offset from each of the magnetically coupled phase paths, the second phase offset substantially equal to 180 degrees relative to the second frequency.

13. The method of claim 12, further comprising activating a second magnetically uncoupled phase path at the second frequency.

14. A power-supply controller, comprising:
a phase controller operable,
  to enable a first number of magnetically uncoupled phase paths in response to a load current having a first relationship to a first threshold level, and
  to enable a second number of magnetically coupled phase paths in response to the load current having a second relationship to the first threshold level; and
a load-current monitor coupled to the phase controller, operable to be coupled to the magnetically uncoupled and coupled phase paths, and operable to determine the load current; and
wherein the phase controller is further operable:
  to activate each of the enabled first number of the magnetically uncoupled phase paths at a first frequency; and
  to activate each of the enabled second number of the magnetically coupled phase paths at a second frequency that is substantially equal to a quotient of the first frequency divided by the second number.

15. The power-supply controller of claim 14 wherein:
the first number equals one; and
the second number is greater than one.

16. The power-supply controller of claim 14 wherein the phase controller is operable:
  to enable the first number of magnetically uncoupled phase paths in response to a magnitude of the load current being smaller than the first threshold level; and
  to enable the second number of magnetically coupled phase paths in response to the magnitude of the load current being greater than the first threshold level.

17. The power-supply controller of claim 14 wherein the phase controller is operable to enable at least one magnetically uncoupled phase path in response to a magnitude of the load current being greater than the first threshold level.

18. The power-supply controller of claim 14 wherein the phase controller is operable to disable the second number of magnetically coupled phase paths in response to a magnitude of the load current being smaller than the first threshold level.

19. The power-supply controller of claim 14, further comprising:
an inductor assembly comprising a core having members; and
wherein each of the magnetically coupled and uncoupled phase paths includes a winding disposed about a respective one of the members.

20. A power-supply controller, comprising:
a phase controller operable
  to enable a first number of magnetically uncoupled phase paths in response to a load current having a first relationship to a first threshold level, and
  to enable a second number of magnetically coupled phase paths in response to the load current having a second relationship to the first threshold level; and
a load-current monitor coupled to the phase controller, operable to be coupled to the magnetically uncoupled and coupled phase paths, and operable to determine the load current;
an inductor assembly including a core having
  a group of first members that are magnetically coupled to one another, and
  a group of second members that are each magnetically isolated from the first members and from the other second members;
wherein each of the magnetically coupled phase paths includes a winding disposed about a respective one of the first members; and
wherein each of the magnetically uncoupled phase paths includes a winding disposed about a respective one of the second members.

21. The power-supply controller of claim 20 wherein the load-current monitor is operable to determine a magnitude of the output current.

22. A power supply, comprising:
an input node operable to receive an input voltage;
an output node operable to provide a regulated output voltage and a load current;
a first number of magnetically uncoupled phase paths coupled between the input and output nodes, each of the first number of phase paths operable, when active, to provide a respective portion of the load current;
a second number of magnetically coupled phase paths coupled between the input and output nodes, each of the second number of the phase paths operable, when active, to provide a respective portion of the load current; and
a power-supply controller coupled to the first number of the magnetically uncoupled phase paths and to the second number of the magnetically uncoupled phase paths, the power-supply controller comprising
  a phase controller operable
    to enable the first number of magnetically uncoupled phase paths in response to the load current having a first relationship to a first threshold level,
    to activate the enabled first number of magnetically uncoupled phase paths at a first frequency,
    to enable the second number of magnetically coupled phase paths in response to the load current having a second relationship to the first threshold level, and
    to activate the enabled second number of magnetically coupled phase paths at a second frequency that is approximately equal to quotient of the first frequency divided by the second number, and
  a output-current monitor coupled to the phase controller and to the magnetically uncoupled and coupled phase paths, and operable to determine the output current.

23. A system, comprising:
a power supply, comprising
  an input node operable to receive an input voltage,
  an output node operable to provide a regulated output voltage and a load current,
  a first number of magnetically uncoupled phase paths coupled between the input and output nodes, each of the first number of phase paths operable, when active, to provide a respective portion of the load current,
  a second number of magnetically coupled phase paths coupled between the input and output nodes, each of the second number of the phase paths operable, when active, to provide a respective portion of the load current, and a power-supply controller coupled to the first number of the magnetically uncoupled phase paths and to the second number of the magnetically uncoupled phase paths, the power-supply controller comprising a phase controller operable
to enable the first number of magnetically uncoupled phase paths in response to the load current having a first relationship to a first threshold level, and
to enable the second number of magnetically coupled phase paths in response to the load current having a second relationship to the first threshold level, and a load-current monitor coupled to the phase controller and to the magnetically uncoupled and coupled phase paths, and operable to determine the load current; and wherein the phase controller is further operable:
to activate each of the enabled first number of the magnetically uncoupled phase paths at a first frequency; and
to activate each of the enabled second number of the magnetically coupled phase paths at a second frequency that is substantially equal to a quotient of the first frequency divided by the second number; and a load coupled to the output node.

24. The system of claim 23, further comprising:
an integrated-circuit die; and
wherein the power-supply controller and the load are disposed on the die.

25. The system of claim 23, further comprising:
first and second integrated-circuit dies;
wherein the controller is disposed on the first die; and
wherein the load is disposed on the second die.

26. The system of claim 23 wherein the load comprises an integrated circuit.

27. A method comprising:
enabling a magnetically uncoupled phase path in response to a load current having a first relationship to a first threshold level; and
enabling a number of magnetically coupled phase paths in response to the load current having a second relationship to the first threshold level;
wherein enabling the uncoupled phase path in response to the load current having a first relationship to the first threshold level comprises enabling the uncoupled phase path in response to a magnitude of the load current being less than the first threshold level;
disabling the coupled phase paths in response to the magnitude of the output current being less than the first threshold level;
wherein enabling the coupled phase paths in response to the load current having a second relationship to the first threshold level comprises enabling the coupled phase paths in response to the magnitude of the load current being greater than the first threshold level; and enabling the uncoupled phase path in response to the magnitude of the load current being greater than the first threshold level.

28. A method comprising:
enabling a magnetically uncoupled phase path in response to a load current having a first relationship to a first threshold level; and enabling a number of magnetically coupled phase paths in response to the load current having a second relationship to the first threshold level;
wherein enabling the uncoupled phase path in response to the load current having a first relationship to the first threshold level comprises enabling the uncoupled phase path in response to a magnitude of the load current being less than the first threshold level;
disabling the coupled phase paths in response to the magnitude of the load current being less than the first threshold level;
wherein enabling the coupled phase paths in response to the load current having the first relationship to the first threshold level comprises enabling the coupled phase paths in response to the magnitude of the load current being greater than the first threshold level;
disabling the uncoupled phase path in response to the magnitude of the load current being greater than the first threshold level and less than a second threshold level; and
enabling the uncoupled phase path in response to the magnitude of the load current being greater than the second threshold level.

29. A method comprising:
enabling a magnetically uncoupled phase path in response to a load current having a first relationship to a first threshold level; and
enabling a number of magnetically coupled phase paths in response to the load current having a second relationship to the first threshold level;
while the magnetically coupled phase paths are enabled, activating each of the magnetically coupled phase paths at a first frequency; and
while the magnetically uncoupled phase path is enabled, activating the uncoupled phase path at a second frequency that is substantially equal to a product of the first frequency and the number of magnetically coupled phases.

30. A method comprising:
enabling a magnetically uncoupled phase path in response to a load current having a first relationship to a first threshold level; and
enabling a number of magnetically coupled phase paths in response to the load current having a second relationship to the first threshold level;
while the magnetically coupled phase paths are enabled, activating each of the magnetically coupled phase paths at a first frequency and at a first time offset relative to one of the other coupled phase paths; and
while the magnetically uncoupled phase path is enabled, activating the uncoupled phase path at a second frequency that is substantially equal to a product of the first frequency and the number of magnetically coupled phases and at a second time offset relative to each of the coupled phase paths.

31. A method comprising:
enabling a magnetically uncoupled phase path in response to a load current having a first relationship to a first threshold level; and
enabling a number of magnetically coupled phase paths in response to the load current having a second relationship to the first threshold level;
while the magnetically coupled phase paths are enabled, activating each of the magnetically coupled phase paths at a first frequency and at a first time offset relative to one of the other coupled phase paths; and while the magnetically uncoupled phase path is enabled, activating the uncoupled phase path at the first frequency and at the first time offset relative to one of the coupled phase paths.

32. A method comprising:

enabling a magnetically uncoupled phase path in response to a load current having a first relationship to a first threshold level; and enabling a number of magnetically coupled phase paths in response to the load current having a second relationship to the first threshold level;

while the magnetically coupled phase paths are enabled, activating each of the magnetically coupled phase paths at a first frequency and at a first time offset relative to one of the other coupled phase paths; and while the magnetically uncoupled phase path is enabled, activating the uncoupled phase path at the first frequency and substantially in phase with one of the coupled phase paths.

* * * * *

UNITED STATES PATENT AND TRADEMARK OFFICE
CERTIFICATE OF CORRECTION

PATENT NO. : 8,570,009 B2
APPLICATION NO. : 12/136014
DATED : October 29, 2013
INVENTOR(S) : Jia Wei and Michael Jason Houston It is certified that error appears in the above-identified patent and that said Letters Patent is hereby corrected as shown below:

In the Claims

In Claim 11, Column 16, Lines 43 and 44 of the patent, the phrase "activating a first magnetically uncoupled phase path a second frequency;" should read --activating a first magnetically uncoupled phase path at a second frequency;--

In Claim 12, Column 16, Lines 63 and 64 of the patent, the phrase "activating a first magnetically uncoupled phase path a second frequency;" should read --activating a first magnetically uncoupled phase path at a second frequency;--

Signed and Sealed this
Twenty-ninth Day of March, 2016

Michelle K. Lee
*Director of the United States Patent and Trademark Office*